US011374635B2

(12) United States Patent
Huang et al.

(10) Patent No.: US 11,374,635 B2
(45) Date of Patent: Jun. 28, 2022

(54) METHOD AND APPARATUS FOR SENSOR ASSISTED BEAM SELECTION, BEAM TRACKING, AND ANTENNA MODULE SELECTION

(71) Applicant: Samsung Electronics Co., Ltd, Suwon-si (KR)

(72) Inventors: Pengda Huang, Allen, TX (US); Jianhua Mo, Garland, TX (US); Boon Loong Ng, Plano, TX (US); Mandar Narsinh Kulkarni, Richardson, TX (US); Won-Suk Choi, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 16/246,284

(22) Filed: Jan. 11, 2019

(65) Prior Publication Data

US 2019/0393944 A1    Dec. 26, 2019

Related U.S. Application Data

(60) Provisional application No. 62/741,202, filed on Oct. 4, 2018, provisional application No. 62/740,756, filed
(Continued)

(51) Int. Cl.
*H04L 7/02*       (2006.01)
*H04B 7/06*       (2006.01)
(Continued)

(52) U.S. Cl.
CPC ......... *H04B 7/0617* (2013.01); *H04B 7/0456* (2013.01); *H04B 7/0639* (2013.01);
(Continued)

(58) Field of Classification Search
CPC .. H04B 7/0617; H04B 7/0456; H04B 7/0639; H04B 7/0874; H04W 72/044; H04W 72/085
(Continued)

(56) References Cited

U.S. PATENT DOCUMENTS 6,456,856 B1    9/2002  Werling et al.
2006/0084395 A1  4/2006  Kezys et al.
(Continued)

FOREIGN PATENT DOCUMENTS

JP    2009-533010 A    9/2009
KR    10-1494710 B1    2/2015
(Continued)

OTHER PUBLICATIONS

International Search Report dated Oct. 2, 2019 in connection with International Patent Application No. PCT/KR2019/007469, 5 pages.
(Continued)

*Primary Examiner* — Zewdu A Kassa

(57) ABSTRACT

The present disclosure includes a method and apparatus for sensor assisted beam selection. A method for sensor assisted beam selection includes receiving an input from a sensor indicating a presence of an obstacle proximate to the sensor. The method further includes identifying an antenna module proximate to the sensor. The method further includes deactivating at least a portion of the identified antenna module based on the input from the sensor.

20 Claims, 37 Drawing Sheets

Related U.S. Application Data on Oct. 3, 2018, provisional application No. 62/688,888, filed on Jun. 22, 2018.

(51) Int. Cl.

| | | |
|---|---|---|
| *H04W 72/04* | (2009.01) | |
| *H04B 7/0456* | (2017.01) | |
| *H04B 7/08* | (2006.01) | |
| *H04W 72/08* | (2009.01) | |

(52) U.S. Cl.
CPC ........ *H04B 7/0874* (2013.01); *H04W 72/044* (2013.01); *H04W 72/085* (2013.01)

(58) Field of Classification Search
USPC .................. 375/360, 359, 354, 219, 295, 31
See application file for complete search history.

(56) References Cited

U.S. PATENT DOCUMENTS

| | | | |
|---|---|---|---|
| 2011/0250928 A1* | 10/2011 | Schlub | H01Q 1/243 |
| | | | 455/550.1 |
| 2014/0269977 A1* | 9/2014 | Yang | H04B 7/0834 |
| | | | 375/295 |
| 2014/0334564 A1 | 11/2014 | Singh et al. | |
| 2015/0195026 A1 | 7/2015 | Sagong et al. | |
| 2016/0198474 A1 | 7/2016 | Raghavan et al. | |
| 2017/0329002 A1 | 11/2017 | Koerber et al. | |
| 2017/0359106 A1* | 12/2017 | John Wilson | H04B 7/0408 |
| 2018/0146419 A1 | 5/2018 | Raghavan et al. | |
| 2018/0301937 A1* | 10/2018 | Park | H02J 50/12 |
| 2019/0150003 A1* | 5/2019 | He | H04B 7/086 |
| | | | 342/368 |

FOREIGN PATENT DOCUMENTS

| | | |
|---|---|---|
| WO | 2007/118211 A2 | 10/2007 |
| WO | 2017184190 A1 | 10/2017 |

OTHER PUBLICATIONS

Written Opinion of the International Searching Authority dated Oct. 2, 2019 in connection with International Patent Application No. PCT/KR2019/007469, 5 pages.

Supplementary Partial European Search Report dated Apr. 9, 2021 in connection with European Patent Application No. 19 82 2593, 12 pages.

Chandra et al., "CogCell: Cognitive Interplay between 60 GHz Picocells and 2.4/5 GHz Hotspots in the 5G Era", IEEE Communications Magazine, Jul. 2015, 8 pages.

Kim et al., "An Efficient Beam-tracking Technique for mmWave Communication Systems", IEEE, Oct. 22, 2014, 2 pages.

Supplementary European Search Report dated Aug. 5, 2021 in connection with European Patent Application No. 19 82 2593, 14 pages.

Office Action dated Oct. 5, 2021 in connection with India Patent Application No. 202137003081, 5 pages.

* cited by examiner

| | Antenna module index | Antenna Array index | Beam index |
|---|---|---|---|
| Sensor 1 | AM-1, AM-2 | AA-1a, AA-1b, AA-1c, AA-2a, AA-2b, | $1_1, 2_1, 3_1, 4_1, 6_1,$ $1_2, 2_2, 3_2, 4_2$ |
| Sensor 2 | AM-18, AM-19 | AA-18a, AA-18b, AA-19a, AA-19b | $1_{18}, 2_{18}, 3_{18}, 6_{18},$ $1_{19}, 2_{19}, 3_{19}, 4_{19}$ |
| Sensor 3 | AM-21 | AA-21a, AA-21c | $1_{21}, 2_{21}, 3_{21}, 4_{21},$ $5_{21}, 6_{21}, 7_{21}$ |

METHOD AND APPARATUS FOR SENSOR ASSISTED BEAM SELECTION, BEAM TRACKING, AND ANTENNA MODULE SELECTION

CROSS-REFERENCE TO RELATED APPLICATION AND CLAIM OF PRIORITY

This application claims priority under 35 U.S.C. § 119(e) to U.S. Provisional Patent Application No. 62/688,888 filed Jun. 22, 2018; U.S. Provisional Patent Application No. 62/740,756 filed Oct. 3, 2018; and U.S. Provisional Patent Application No. 62/741,202 filed Oct. 4, 2018. The above-identified provisional patent applications are hereby incorporated by reference in their entirety.

TECHNICAL FIELD

The present disclosure relates generally to millimeter wave (mmWave) wireless communication. More specifically, the present disclosure relates to sensor assisted beam selection, tracking, and antenna module selection.

BACKGROUND

Millimeter wave (mmWave) wireless communication systems are commonly used in $5^{th}$ Generation (5G) wireless communication systems. mmWave bands enable a device to transmit data a high frequency. However, mmWave bands may be easily blocked by an object located near the device. Transmitting mmWave bands in all directions in anticipation of some of the mmWave bands being blocked results in excessive battery consumption. By using sensors to scan for objects and determine an ideal beam direction to transmit data using mmWave bands or other bands, a device may significantly reduce the battery consumption and time required to determine the beam for data transmission using mmWave bands or other frequency bands.

SUMMARY

Embodiments of the present disclosure include a method and apparatus for sensor assisted beam selection, tracking, and antenna module selection.

In one embodiment, a user equipment (UE) in a wireless communication system is provided. The UE may include a plurality of antenna modules. The UE further includes a sensor positioned proximate to an antenna module in the plurality of antenna modules and configured to detect an obstacle proximate to the sensor. The UE further includes a processor configured to receive an input from the sensor indicating a presence of the obstacle proximate to the sensor, identify the antenna module proximate to the sensor, and deactivate at least a portion of the identified antenna module based on the input from the sensor.

In another embodiment, a method of UE in a wireless communication system is provided. The method includes receiving an input from a sensor indicating a presence of an obstacle proximate to the sensor. The method further includes identifying an antenna module proximate to the sensor. The method further includes deactivating at least a portion of the identified antenna module based on the input from the sensor.

In this disclosure, the terms antenna module, antenna array, and beam are frequently used. An antenna module may consist of one or more arrays. One antenna array may consists of one or more antenna elements. Each antenna element may include one or more polarizations, for example vertical polarization or horizontal polarization. An antenna module may include a beam. A beam may be a radiation pattern from one or more antenna elements or one or more antenna arrays.

Other technical features may be readily apparent to one skilled in the art from the following figures, descriptions, and claims.

Before undertaking the DETAILED DESCRIPTION below, it may be advantageous to set forth definitions of certain words and phrases used throughout the present disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout the present disclosure. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

FIGS. 1 through 26, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

Figure 1:
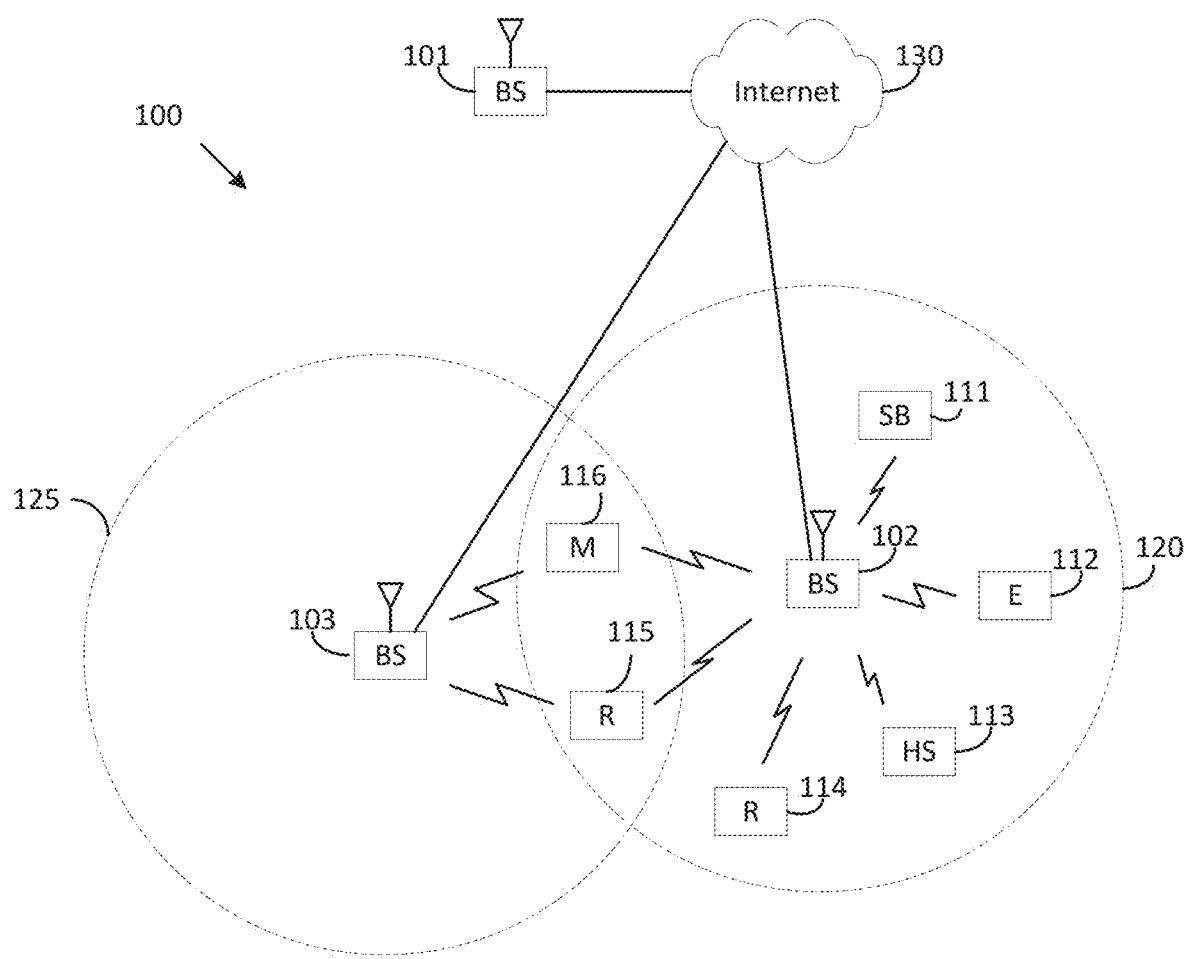
FIG. 1 illustrates an example wireless network according to various embodiments of the present disclosure.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network 100 includes an gNB 101, an gNB 102, and an gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the internet 130 for a first plurality of UEs within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the internet 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or gNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in the present disclosure to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in the present disclosure to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient beam management in an advanced wireless communication system. In certain embodiments, and one or more of the gNBs 101-103 includes circuitry, programing, or a combination thereof, for efficient beam management in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the internet 130. Similarly, each gNB 102-103 could communicate directly with the internet 130 and provide UEs with direct wireless broadband access to the internet 130. Further, the gNBs 101, 102, and/or 103 could provide access to other or additional external networks, such as external telephone networks or other types of data networks.

Figure 2:
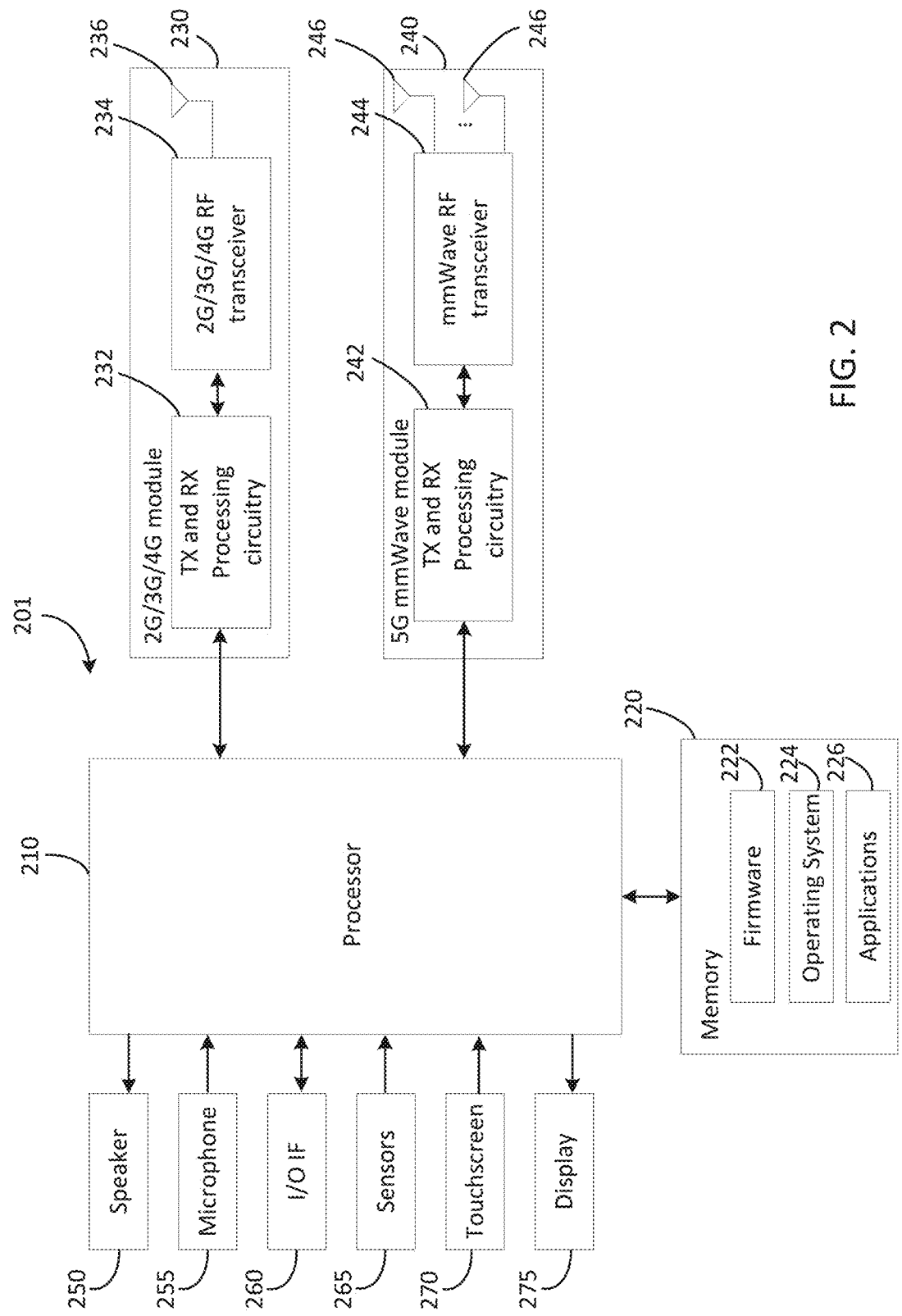
FIG. 2 illustrates an example user equipment (UE) according to various embodiments of the present disclosure.

FIG. 2 illustrates an example UE according to various embodiments of the present disclosure. As shown in FIG. 2, the UE 201 includes a processor 210, a memory 220, a 2G/3G/4G module 230, and a 5G millimeter wave (mmWave) module 240. In some embodiments, the UE 201 may be one of the UEs 111-116 illustrated in FIG. 1.

The processor 210 may include one or more of a CPU, an Application Processor (AP), and a Communication Processor (CP). The processor 210 may execute, for example, operations or data processing relating to the control and/or communication of at least one other element of the UE 201. The processor 210 may execute programs of the operating system 224 stored in the memory 220. The processor 210 may control the operation of one or more of the 2G/3G/4G module 230 and 5G mmWave module 240.

In some embodiments, the memory 220 includes firmware 222, an operating system 224, and applications 226. The operating system 224 may be executed by the processor 210 to control the operations of the UE 201. The applications 226 may include a plurality of applications such as applications for multi-user, multi-input multi-output (MU-MIMO) communications, including obtaining control channel elements of physical downlink control channels (PDCCH). The processor 210 may operate the applications 226 based on the parameters of the operating system 224 or in response to a signal received through the 2G/3G/4G module 230 or 5G mmWave module 240.

In various embodiments, the memory 220 may be of sufficient size to store at least one of angle of arrival information or rotation information of the UE 201. In some embodiments, the present disclosure includes methods to reduce memory consumption in order to preserve space in the memory 220 for additional angle of arrival and/or rotation information. Various factors may be used to determine an ideal size of the memory 220, including but not limited to the speed of rotation of the UE 201, the speed of the movement of the UE 201, the variation rate of signal to noise ratio (SNR) at the UE 201, and the codebook update rate in the past period of time.

In embodiments where the rotation and/or movement speed of the UE 201 is high, the memory 220 may be small to store the angle of arrival samples. In these embodiments, the codebook may need to be updated more frequently because of the higher rotation and/or movement speed of the UE 201. In embodiments where the rotation and/or movement speed of the UE 201 is low, the memory 220 may be large to store the angle of arrival samples. The processor 210 may detect the rotation and/or movement speed of the UE 201 using one or more of the sensors 265.

An additional factor in determining an optimal size of the memory 220 is the variation of the SNR. In embodiments where the SNR averaged over a time period varies frequently, the memory 220 may not need to be as large as when the SNR averaged over a time period varies less frequently.

An additional factor in determining an optimal size of the memory 220 is the rate at which the codebook updates. For example, in embodiments where the codebook is updated more frequently, the memory 220 may not need to be as large as when the codebook is updated less frequently.

As shown in FIG. 2, the 2G/3G/4G module 230 includes transmission (Tx) and receiving (Rx) processing circuitry 232, a 2G/3G/4G radiofrequency (RF) transceiver 234, and an antenna 236. In some embodiments, the operation of the 2G/3G/4G module 230 is controlled by the processor 210. The 2G/3G/4G RF transceiver 234 is configured to receive a 2G, 3G, or 4G signal from the antenna 236 transmitted over the wireless network 100. The RF transceiver 234 down-converts the incoming RF signal to generate an intermediate frequency (IF) or baseband signal. The IF or baseband signal is sent to the RX processing circuitry 232, which generates a processed baseband signal by filtering, decoding, and/or digitizing the baseband or IF signal. The RX processing circuitry 232 transmits the processed baseband signal to the processor 210 for further processing (such as for voice or web browsing data).

The TX processing circuitry 232 receives outgoing baseband data (such as voice, web data, e-mail, or interactive video game data) from the processor 210. The TX processing 232 circuitry encodes, multiplexes, and/or digitizes the outgoing baseband data to generate a processed baseband or IF signal. The RF transceiver 234 receives the outgoing processed baseband or IF signal from the TX processing circuitry 232 and up-converts the baseband or IF signal to an RF signal that is transmitted over the wireless network 100 via the antenna 236.

As shown in FIG. 2, the 5G mmWave module 240 includes Tx and Rx processing circuitry 242, a mmWave RF transceiver 244, and at least one antenna 246. Although shown in FIG. 2 with two antennas 246, the 5G mmWave module may comprise more or less than two antennas. In some embodiments, the operation of the 5G mmWave module 240 is controlled by the processor 210. The RF transceiver 244 is configured to receive a 5G mmWave signal from the antenna 246 transmitted over the wireless network 100. The RF transceiver 244 down-converts the incoming RF signal to generate an intermediate frequency (IF) or baseband signal. The IF or baseband signal is sent to the RX processing circuitry 242, which generates a processed baseband signal by filtering, decoding, and/or digitizing the baseband or IF signal. The RX processing circuitry 242 transmits the processed baseband signal to the processor 210 for further processing (such as for voice or web browsing data).

The TX processing circuitry 242 receives outgoing baseband data (such as voice, web data, e-mail, or interactive video game data) from the processor 210. The TX processing 242 circuitry encodes, multiplexes, and/or digitizes the outgoing baseband data to generate a processed baseband or IF signal. The RF transceiver 244 receives the outgoing processed baseband or IF signal from the TX processing circuitry 242 and up-converts the baseband or IF signal to an RF signal that is transmitted over the wireless network 100 via the antenna 246.

In some embodiments, the UE 201 may also include a speaker 250, a microphone 255, an input/output interface (I/O IF) 260, one or more sensors 265, a touchscreen 270, and a display 275. The processor 210 controls the speaker 250 to output sound such as voice data. The processor 210 can receive input, such as voice data, from the microphone 255. The received data from the microphone 255 may cause the processor 210 to execute one or more of the applications 226. The processor 210 is coupled to the I/O interface 260. The I/O interface 260 is configured to allow the UE 201 to connect to various other devices that may or may not be included in the wireless network 100. For example, the UE 201 may connect to a laptop computer or tablet through the I/O interface 260.

The sensors 265 may include at least one of a touch sensor, proximity sensor, accelerometer, magnetometer, or gyroscope. The sensors 265 obtain data about the UE 201 and the environment surrounding the UE 201. The processor 210 may transmit specific 5G mmWave data or 2G/3G/4G data based on data obtained by one or more of the sensors 265. The touchscreen 270 may be used by an operator, such as a user, to input data into the UE 201. The display 275 may be a liquid crystal display, light emitting diode display, or other display capable of rendering text and/or at least limited graphics. Although illustrated in FIG. 2 as separate features, in some embodiments the display 275 may be incorporated into the touchscreen 270.

Although FIG. 2 illustrates one example of a UE 201, various changes may be made to FIG. 2. For example, various components in FIG. 2 could be combined, further subdivided, or omitted. Further, additional components could be added according to particular needs. As a particular example, the processor could be divided into multiple processors, such as one or more central processing units (CPUs) and one or more graphics processing units (GPUs). Also, while FIG. 2 illustrates the UE configured as a mobile telephone or smartphone, UEs could be configured to operate as other types of mobile or stationary devices.

Figure 3:
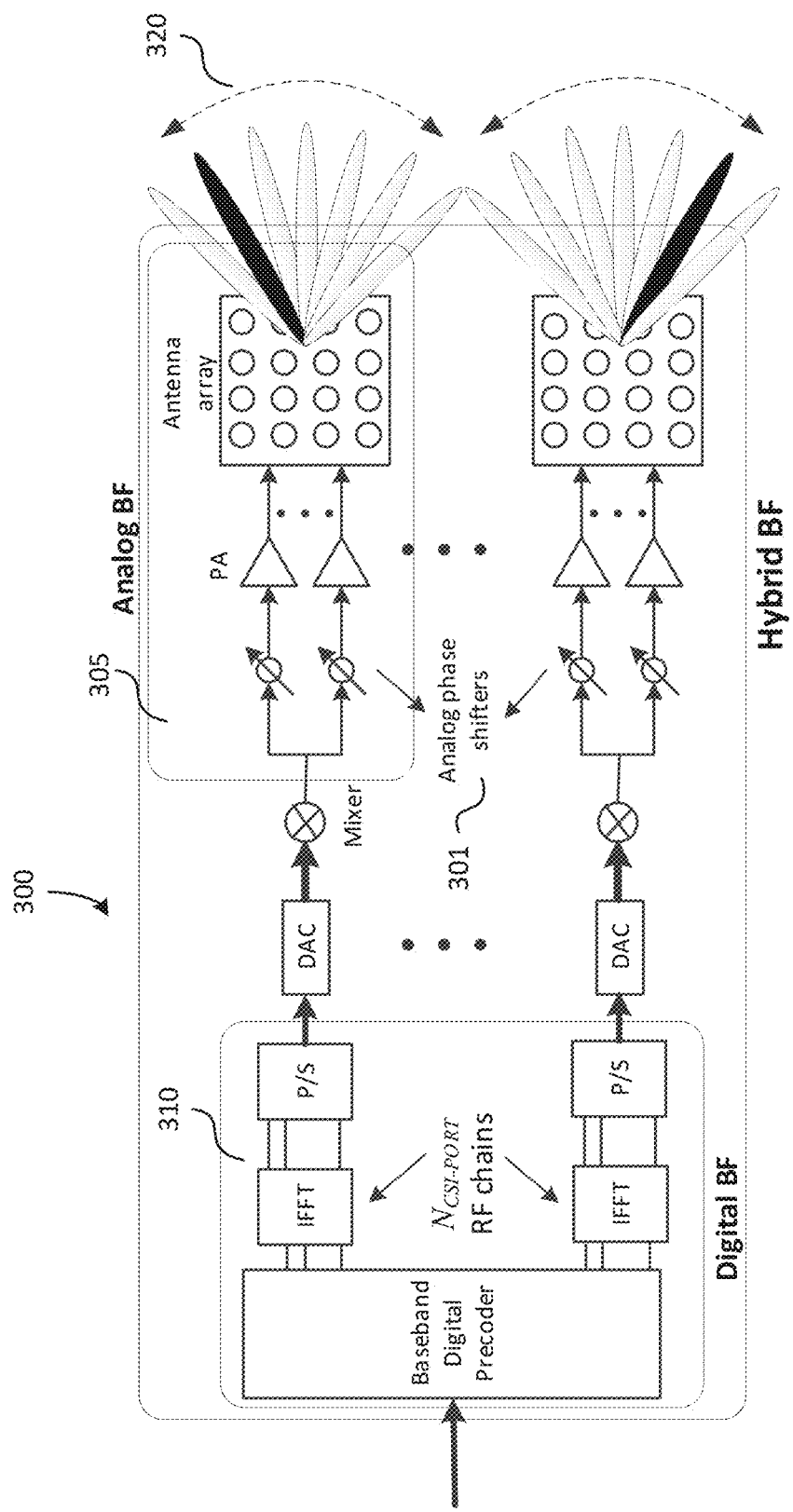
FIG. 3 illustrates an example of hybrid beamforming according to various embodiments of the present disclosure.

FIG. 3 illustrates an example of hybrid beamforming according to various embodiments of the present disclosure. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in transmitter 300 of FIG. 3. In this case, one CSI-RS port is mapped onto a large number of antenna elements which can be controlled by a bank of analog phase shifters 301. One CSI-RS port can then correspond to one sub-array which produces a narrow analog beam through analog beamforming 305. This analog beam can be configured to sweep across a wider range of angles 320 by varying the phase shifter bank across symbols or subframes or slots (wherein a subframe or a slot comprises a collection of symbols). The number of sub-arrays (equal to the number of RF chains) is the same as the number of CSI-RS ports $N_{CSI-PORT}$. A digital beamforming unit 310 performs a linear combination across $N_{CSI-PORT}$ analog beams to further increase precoding gain. While analog beams are wideband (hence not frequency-selective), digital precoding can be varied across frequency sub-bands or resource blocks.

A UE 201 is configured with CSI-RS for CSI measurement and reporting. An allocation unit for CSI-RS can be termed CSI-RS resource which can correspond to non-zero-power (NZP) or zero-power (ZP). NZP CSI-RS is mainly used for channel measurement while ZP CSI-RS for interference measurement. For 5G NR, NZP CSI-RS resource is defined as a set of NZP CSI-RS port(s) mapped to a set of REs within a frequency span/a time duration which can be measured at least to derive a CSI. Multiple NZP CSI-RS resources can be configured to UE for supporting CoMP, beam management, and multiple beamformed CSI-RS based operations, where each NZP CSI-RS resource can have different number of CSI-RS ports.

Figure 4:
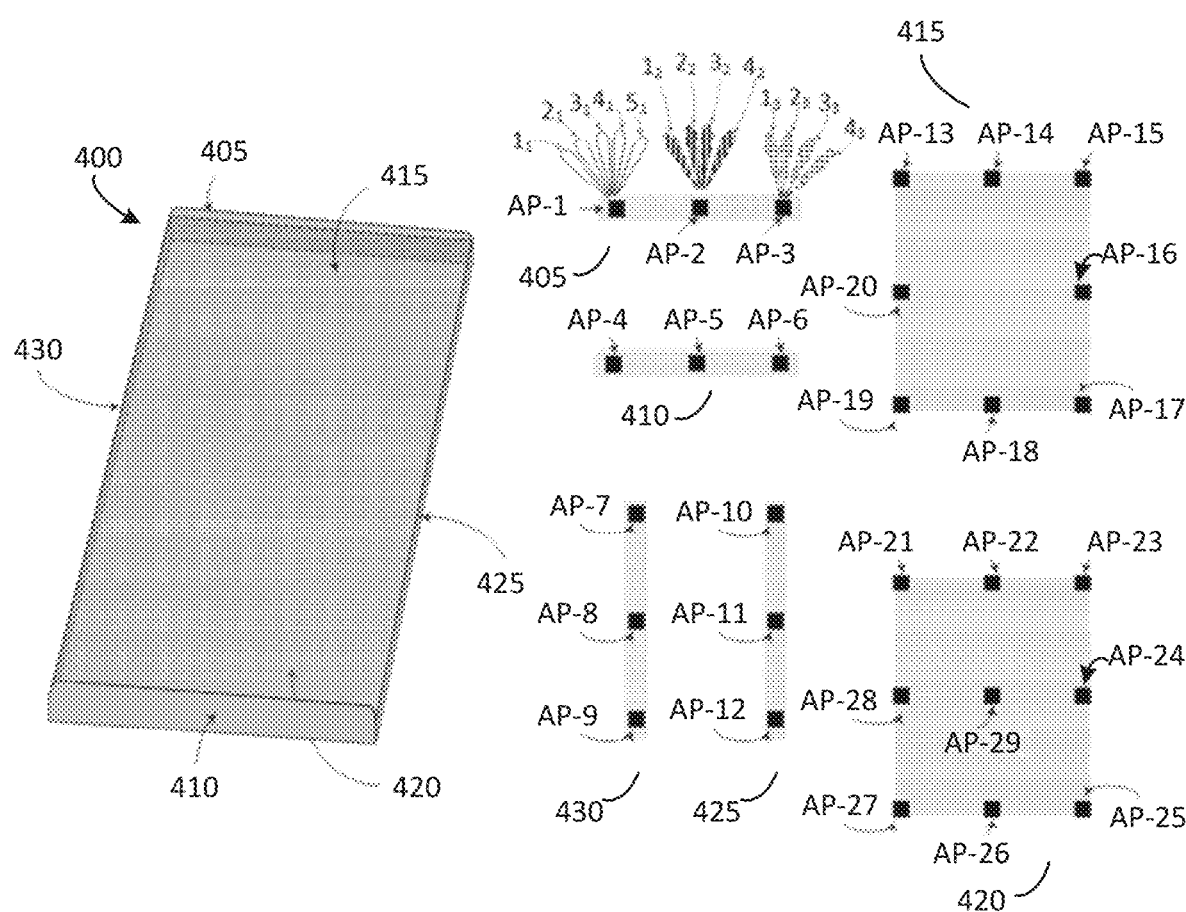
FIG. 4 illustrates an example UE including various antenna patch positions according to various embodiments of the present disclosure.

FIG. 4 illustrates an example UE including various antenna module positions according to various embodiments of the present disclosure. Although illustrated in FIG. 4 as having twenty-nine separate locations for antenna modules, a UE 400 may include more or less antenna modules. In some embodiments, the UE 400 may be the UE 201 illustrated in FIG. 2. In FIG. 4, each antenna module is depicted as corresponding to a separate antenna patch (AP). Although not shown, in some embodiments an antenna patch may include more than one antenna module.

As illustrated in FIG. 4, the UE 400 includes a top plane 405, a bottom plane 410, a front plane 415, a back plane 420, a right plane 425, and a left plane 430. The top plane 405 includes antenna patch 1 (AP-1), AP-2, and AP-3. The bottom plane 410 includes AP-4, AP-5, and AP-6. The left plane 430 includes AP-7, AP-8, and AP-9. The right plane 425 includes AP-10, AP-11, and AP-12. The front plane 415 includes AP-13, AP-14, AP-15, AP-16, AP-17, AP-18, AP-19, and AP-20. The back plane 420 includes AP-21, AP-22, AP-23, AP-24, AP-25, AP-26, AP-27, AP-28, and AP-29.

Each antenna patch comprises an antenna module configured to generate at least one beam L. Although FIG. 4 illustrates one antenna module at each antenna patch, an antenna patch may include more than one antenna module. In various embodiments, a UE 400 may comprise N antenna modules where N is a positive integer larger than or equal to 1. There are $L_n$ beams to be generated on the n-th antenna module. The set of the $L_n$ beams is denoted by $s_n$. The combination of the N antenna modules generates the set of the candidate beams which can be used by the UE. The set of all the candidate beams for the UE is denoted by S, $S = \cup_{n=1}^{N} s_n$. Each member of the candidate beam set may generate stronger gain at a different direction.

As illustrated in FIG. 4, N=29 for the twenty-nine antenna modules, each of which is located on a separate antenna patch. As an example, AP-1, AP-2, and AP-3 illustrate beams L. Although AP-4 through AP-29 are not depicted as showing beams L, the beams L depicted in AP-1 through AP-3 can be considered representative of all twenty-nine antenna patches. Antenna module 1, corresponding to AP-1, is depicted as transmitting five beams. Therefore, $L_1=5$. The five beams are labeled as $1_1, 2_1, 3_1, 4_1$, and $5_1$, respectively. This is represented by set $s_1$ such that $s_1=\{1_1, 2_1, 3_1, 4_1, 5_1\}$. By the same approach, the two sets of the beams for antenna module 2 and module 3 are defined as $s_2=\{1_2, 2_2, 3_2, 4_2\}$ and $s_3=\{1_3, 2_3, 3_3, 4_3\}$, respectively. Although only the beams for AP-1, AP-2, and AP-3 are illustrated in FIG. 4, this approach to defining a set of beams belonging to an antenna module applies to all the other antenna modules corresponding to the antenna patches described in FIG. 4.

When the processor 210 is ready to transmit data or a signal, at least one beam L may be activated. In order to achieve the greatest potential link quality, the beam L with the potential to generate the highest gain among the beam set s should be selected. In some embodiments, the beam set s from which the processor 210 may selection a beam L may be large. To determine which beam or beams L of the beam set s should generate and transmit a particular signal, the processor 210 is configured to control a beam selection process. In order to determine which beam or beams L of the beam set s should generate and transmit the signal, the beam selection process may include the processor 210 controlling to scan some or all of the antenna patches AP-1 through AP-29 to determine the optimal beam or beams L. This process can be time consuming and delay the transmission of a signal. The beam selection process may also consume a significant amount of power from the UE 400 resulting in a shorter battery life than may be desired. In some embodiments, the UE 400 may be equipped with sensors 265 to decrease the time and power consumption required to carry out the beam selection process.

Figure 5:
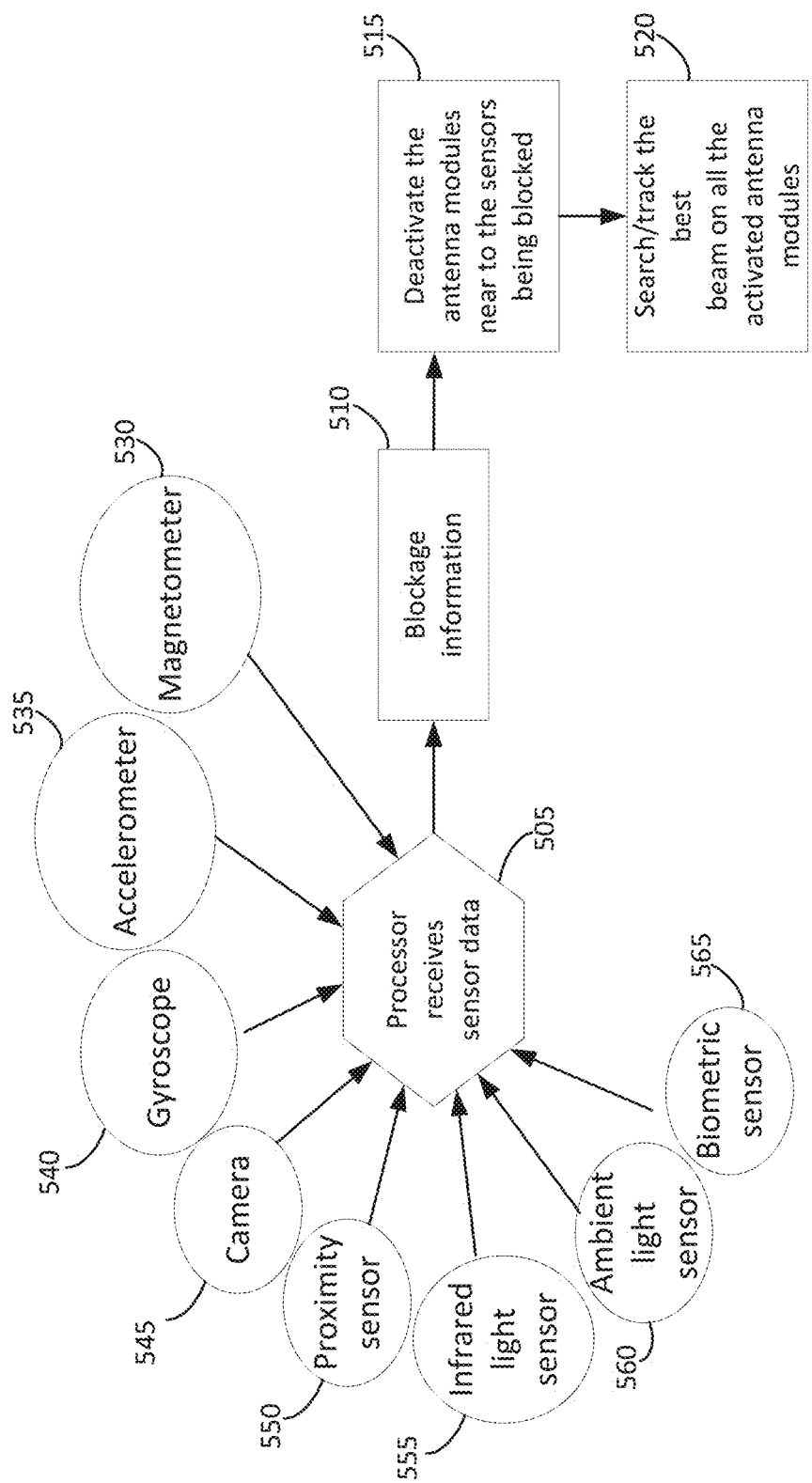
FIG. 5 illustrates an example of sensor assisted beam searching according to various embodiments of the present disclosure.

FIG. 5 illustrates an example of sensor assisted beam searching according to various embodiments of the present disclosure. As illustrated in FIG. 5, the sensors 265 may include one or more of sensors 530-565. For example, the sensors 265 may include one or a combination of a magnetometer 530, an accelerometer 535, a gyroscope 540, a camera 545, a proximity sensor 550, an infrared light sensor 555, an ambient light sensor 560, or a biometric sensor 565. The UE 201 may include several of one type of sensor. In some embodiments, the UE 201 may include a separate proximity sensor 550 corresponding to each antenna patch located on the UE 201. For example, a separate proximity sensor 550 may be located proximate to each of AP-1 through AP-29, respectively, such that the processor 210 is able to determine the proximity of an object relative to each antenna patch AP-1 through AP-29 to assist with the beam selection process.

In operation 505, the processor 210 receives sensor data from one or more of the sensors 530-565. For example, the processor 210 may receive sensor information from the proximity sensor 550 that an obstruction is present that may inhibit beams L of an antenna module.

In operation 510, the processor 210 determines blockage information of each antenna patch AP-1 through AP-29 based on the sensor data acquired in operation 505. For example, the processor 210 may receive data from various sensors 530-565 indicating that the UE 201 is lying flat on a surface. This data may include data from the gyroscope 540 that the front plane 415 is facing straight up, data from the camera 545 on the back plane 420 that does not project an image, data from the accelerometer 535 that the UE 201 is not currently in motion, and data from the proximity sensor 550 on the back plane 420 that an object is in close proximity to the back plane 420.

In another example, the processor 210 may receive data from various sensors 530-565 indicating that the UE 201 is located in a user's back pocket, the top portion of the UE 201 is sticking out from the pocket, and the user is walking at a brisk pace. This data may include data from the gyroscope 540 that the top plane 405 is facing directly up, data from the accelerometer 535 that the UE 201 is in currently at a constant speed, and data from the proximity sensors on the front plane 415, back plane 420, and bottom plane 410 that an object, e.g. the user's pocket, is in close proximity to the front plane 415, back plane 420, and bottom plane 410, respectively.

In another example, the processor 210 may receive data from various sensors 530-565 indicating that the UE 201 is being held in a user's hand. This data may include data from the proximity sensors 550 located on the bottom plane 410 and the back plane 420 that an object, e.g. the user's hand, is in close proximity to the bottom plane 410 and the back plane 420.

In operation 515, the processor 210 deactivates the antenna modules near to which a blockage is detected based on the blockage information obtained in operation 510. In the above example where the UE 201 is lying flat on the surface, the processor 210 may deactivate the antenna modules on each of the AP-21 through AP-29, because these antenna modules are located on the back plane 420, which is detected to be blocked by the surface. In the above example where the UE 201 is located in the back pocket of a user's jeans, the processor 210 may deactivate all the antenna modules except those located on AP-1 through AP-3, because these antenna modules are the only ones that are not detected to be blocked. In the above example where the UE 201 is being held by a user, the processor 210 may deactivate the antenna modules on each of the AP-4 through AP-6 and AP-21 through AP-29, because these antenna modules are located on the bottom plane 410 and back plane 420, respectively.

The remaining beams L corresponding to the antenna modules that were not deactivated may be included in an activated subset $S_p$. In some embodiments, the default subset $S_p$ may initially include every beam L and deactivate the beams L of the antenna modules corresponding to the sensor or sensors 265 detecting a blockage. In other embodiments, some or all of the beams L in each antenna module may originally be in a default deactivated state and there may not be a default subset $S_p$. In this embodiment, based on the blockage information obtained by the sensors 265, the processor 210 may compile the subset $S_p$ to include the beams L of the antenna modules that were not detected to be blocked by the sensors 265.

In the determination of beams included in the activation subset $S_p$, in some embodiments the UE 201 may communicate with a network. In some embodiments, the UE 201 may communicate with another wireless apparatus, such as another UE, a vehicle, or an object, such as a piece of furniture, that is equipped with a wireless transceiver. In some embodiments, the UE 201 may not communicate with a network or other wireless apparatus in the determination of beams included in the activation subset $S_p$.

In operation 520, the beams L included in the subset $S_p$ may be used to determine an ideal beam to be used to generate and transmit a signal. In this embodiment, only the beams L included in the subset $S_p$ are scanned for the ideal beam L. By eliminating the beams L that are known to be blocked from the scan, the processor 210 is able to produce the ideal beam L to be used more quickly and by consuming less power than if the processor 210 scanned each and every beam L. The beam selection and scanning process will be described in more detail later.

Once the ideal beam L is determined, the processor 210 may transmit data using the determined ideal beam L. For example, the processor 210 may control the 5G mmWave module 240 to transmit a mmWave band containing data to an external device in the wireless network 100.

Figure 6A:
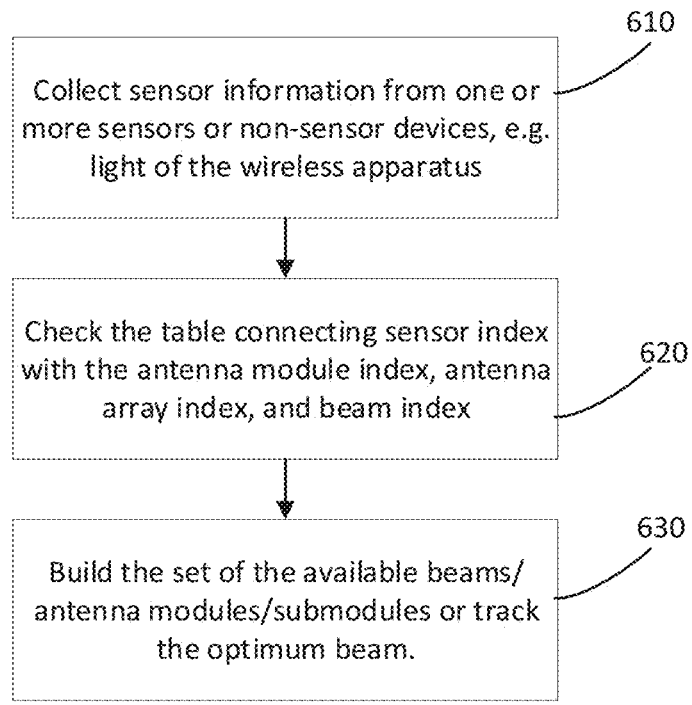
FIG. 6A illustrates a block diagram of sensor assisted beam searching according to various embodiments of the present disclosure.
Figure 6B:
FIG. 6B illustrates an example sensor assisted beam searching connection table according to various embodiments of the present disclosure.

FIG. 6A illustrates a block diagram of sensor assisted beam searching according to various embodiments of the present disclosure. FIG. 6B illustrates an example sensor assisted beam searching connection table according to various embodiments of the present disclosure.

Before or at the time of the sensors assisting the UE selecting beam or antenna module or tracking beam, the UE 201 may have no communication with a network. Alternatively, the UE 201 can have communication with a network. In another alternative case, the UE 201 may have communication with other apparatuses such as another UE, a vehicle, or a home furniture with wireless transceivers. In operation 610, the processor 210 collects sensor information from one or more sensors 265 or non-sensor devices. For example, the processor 210 may collect information from a light of a wireless apparatus.

In operation 620, the processor 210 checks a table connecting the sensor index with the antenna module index, antenna array index, and beam index. For example, the table may be table 640 illustrated in FIG. 6B. Table 640 illustrates an antenna module index, antenna array index, and beam index for each of a sensor 1, sensor 2, and sensor 3. As illustrated in table 640, if Sensor 1 is blocked, Antenna modules AM-1, AM-2, Antenna arraies AA-1$a$, AA-1$b$, AA-1$c$, AA-2$a$, AA-2$b$, beams $1_1$, $2_1$, $3_1$, $4_1$, $6_1$, $1_2$, $2_2$, $3_2$, $4_2$ will be blocked.

In operation 630, based on the sensor information and the information from table 640, the UE 201 builds an activation set of beams/antenna modules/arrays which contains the available beams/antenna modules/arrays for the current communication or the communication in the near future. Alternatively, the UE 201 may track the optimum beam determined from the information in table 640.

By using the table 640, the size of the set of the available beams, antenna modules, or antenna arrays may be minimized. This may result in decreasing the processing time and power consumption of the selection of beam and antenna modules or beam tracking.

In some embodiments, the table 640 may be built and pre-stored in the UE 201, for example in the memory 220. The table 640 may be built according to the field of view (FOV) of the one or more sensors 265 and the FOV of antenna modules. If the FOV of a sensor 265, for example, sensor 1 overlaps with a FOV of antenna modules, for example antenna modules AM-1, AM-2, then the sensor 265 may be determined to be "near" to the antenna modules AM-1 and AM-2. For example, in table 640, Sensor 1 is 'near' to antenna modules AM-1, AM-2. Similarly, Sensor 1 is 'near' to antenna arraies AA-1$a$, AA-1$b$, AA-1$c$, AA-2$a$, and AA-2$b$; Sensor 1 is 'near' to beams $1_1$, $2_1$, $3_1$, $4_1$, $6_1$, $1_2$, $2_2$, $3_2$, $4_2$. If a sensor is blocked, the antenna modules, antenna arrays and the beams 'near' to the sensor is considered to be blocked.

Figure 7:
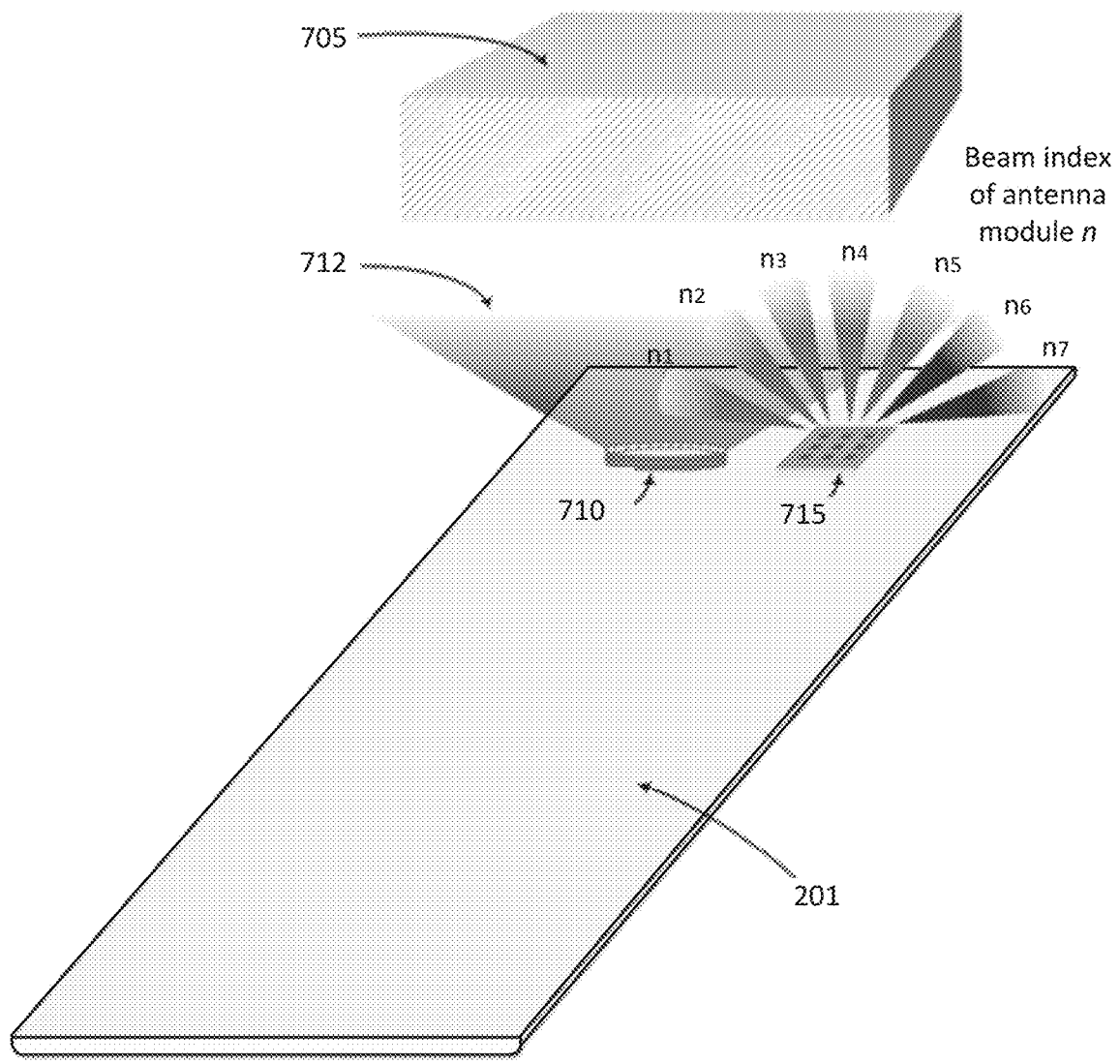
FIG. 7 illustrates an example UE capable of performing camera/ambient light sensor (ALS) assisted beam searching or antenna module selection according to various embodiments of the present disclosure.

In this disclosure, 'near' is not necessary to mean the close physical distance between the sensor(s) 265 and the antenna modules. A sensor 265 and an antenna module being 'near' means the field of view of the sensor and the antenna module has overlapping area. The field of view of the sensor may completely overlap that of the radar module or may only partially overlap that of the radar module. As illustrated in FIG. 7 below, a camera/ALS and antenna module n have an partially overlapping field of view. As illustrated in FIG. 7, the camera/ALS and antenna module n are 'near' to each other.

In another embodiment, the concept of 'near' may illustrate the beam FOV and the sensor 265 FOV. For example, if the FOV of a beam completely or partially overlaps with the FOV of a senor, the beam and the senor are considered to be 'near' to each other.

Figure 8A:
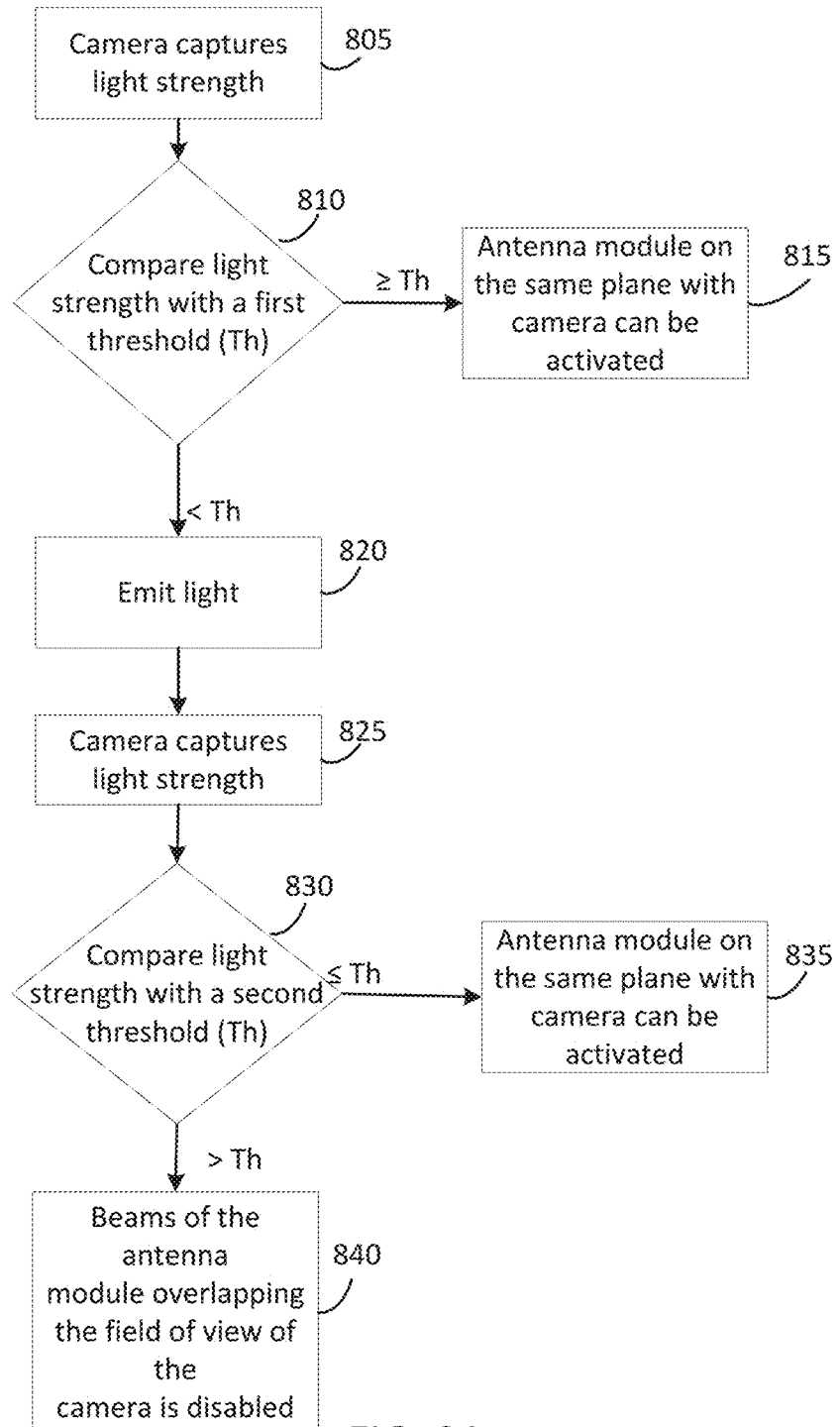
FIGS. 8A and 8B illustrate example methods of camera/ambient light sensor (ALS) assisted beam searching or antenna module selection according to various embodiments of the present disclosure.
Figure 8B:
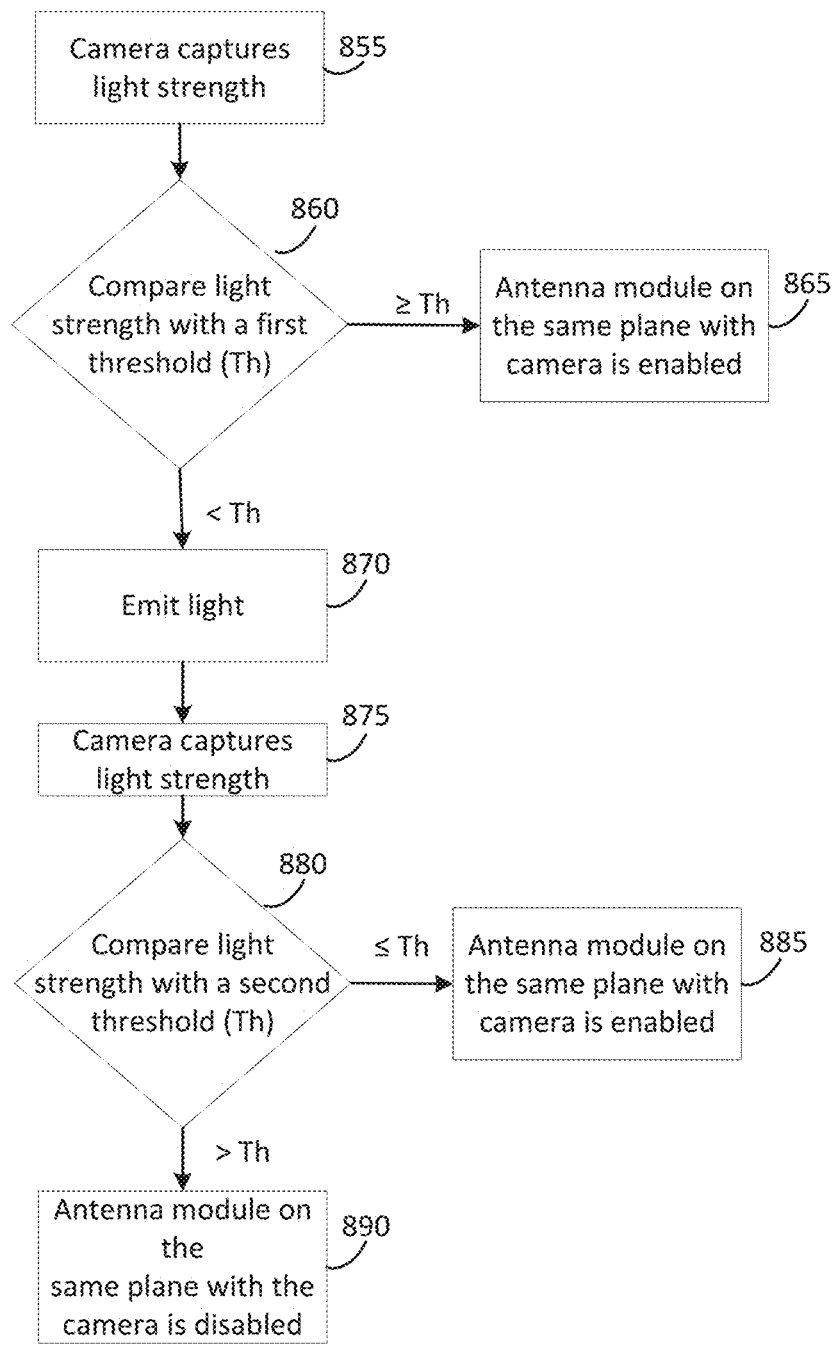

FIG. 7 illustrates an example UE capable of performing camera/ambient light sensor (ALS) assisted beam searching or antenna module selection according to various embodiments of this disclosure. FIGS. 8A and 8B illustrate example methods of camera/ambient light sensor (ALS) assisted beam searching or antenna module selection according to various embodiments of the present disclosure. In FIGS. 7-8B, a sensor 265, such as camera 545 or ambient light sensor 560, is used to assist beam searching or antenna module selection.

FIG. 7 illustrates the UE 201 including a camera/ALS 710 and a corresponding antenna module 715. The camera/ALS 710 includes a field of view 712. Although depicted in FIG. 7 as one camera/ALS sensor 710, the camera/ALS 710 may comprise separate sensors such as a camera 545 and ambient light sensor 560 that work in conjunction to perform as if the two sensors were integrated. In some embodiments, the antenna module 715 may be located on any of the antenna patches AP-1 through AP-29 illustrated in FIG. 4. The antenna module 715 includes a beam index that includes seven beams, illustrated as $n_1$ through $n_7$. The field of view 712 of the camera/ALS 710 includes five beams, $n_1$ through $n_5$. As illustrated in FIG. 7, the field of view 712 does not include the beams $n_6$ and $n_7$.

The geographic orientation of the camera/ALS 710 and antenna module 715, as illustrated in FIG. 7, shows the antenna module 715 near to the camera/ALS 710. Near is defined as having an overlapping area. For example, because antenna module 715 includes the beams $n_1$ through $n_7$, and the field of view 712 of the camera/ALS 710 at least partially overlaps some of the beams $n_1$ through $n_7$ (in this case, $n_1$ through $n_5$), the antenna module 715 is considered to be near the camera/ALS 710.

Although illustrated in FIG. 7 as including only one antenna module 715 comprising a beam index, embodiments of the present disclosure may include one or more of antenna patches AP-1 through AP-29 comprising multiple antenna modules 715, each comprising a separate beam index.

In FIG. 8A, in operation 805, the camera/ALS 710 senses light strength in the area surrounding the UE 201. The light may be natural light, such as sunlight, or artificial light emitted from an external source.

In operation 810, the processor 210 compares the light strength with a first threshold. The first threshold may be predefined by the processor 210 or the processor 210 may adjust the threshold in real time based on the results of previous beam searching.

In operation 815, if the camera/ALS 710 senses the light strength is equal to or above the first threshold, the processor 210 may activate the beams of the antenna module 715. By activating the beams, the processor 210 includes the beams of the antenna module 715 in the subset $S_p$. If the camera/ALS 710 does not sense the light strength is above the first threshold, the processor 210 may not include the beams of the antenna module 715 in the subset $S_p$.

In operation 820, if the camera/ALS 710 does not sense the light strength is at or above the first threshold, the processor 210 may control the UE 201 to emit light. For example, an application 226 may include a flash light application which controls to emit light from the UE 201.

In operation 825, the camera/ALS 710 senses the light a second time. In some embodiments, the light emitted from the UE 201 may be reflected back by an object 705 and sensed by the camera/ALS 710 a second time. The object 705 may be any object that blocks, i.e. obstructs, the light emitted in operation 820. For example, the object 705 may be a part of the user that is holding the UE 201, such as a hand. In other embodiments, the object 705 may be any object a distance away from the UE 201 large enough to reflect light back to the UE 201.

In operation 830, the processor 210 determines if the light sensed in operation 820 is equal to or above a second threshold. In some embodiments, the first threshold may be the same as the second threshold. In other embodiments, the second threshold may be smaller or larger than the first threshold.

In operation 835, if the light sensed in operation 820 is smaller than or equal to the second threshold, the processor 210 activates the beams of the antenna module 715 by the same process as described in operation 815. By activating the beams, the processor 210 includes the beams of the antenna module 715 in the subset $S_p$.

In operation 840, if the sensed light is above the second threshold, the processor 210 may determine the light emitted is being reflected back to the UE 201. In this embodiment, the processor 210 may not include the beams of the antenna module 715 in the subset $S_p$ because the object 705 that reflects the emitted light may also block a beam that is generated. In some embodiments, if the beams are originally activated, the processor 210 may disable the beams of the antenna module 715 near the camera/ALS 710 that sensed the reflected light. For example, as illustrated in FIG. 7, the processor 210 may include the beams $n_6$ and $n_7$ in the subset $S_p$ because the beams $n_6$ and $n_7$ may not be obstructed by the object 705. Beams $n_1$ through $n_5$ are not included in the subset $S_p$ because they are within the field of view 712 that is blocked by the object 705. A beam may be determined to be obstructed if there is a perception that the beam would not reach its intended target. In some embodiments, a beam may be obstructed by an obstacle, for example an object 705.

In FIG. 8B, in operation 855, the camera/ALS 710 senses light strength in the area surrounding the UE 201. The light may be natural light, such as sunlight, or artificial light emitted from an external source.

In operation 860, the processor 210 compares the light strength with a first threshold. The first threshold may be predefined by the processor 210 or the processor 210 may adjust the threshold in real time based on the results of previous beam searching.

In operation 865, if the camera/ALS 710 senses the light strength is equal to or above the first threshold, the processor 210 may enable the beams of the antenna module 715. By enabling the beams, the processor 210 includes the beams of the antenna module 715 in the subset $S_p$. If the camera/ALS 710 does not sense the light strength is above the first threshold, the processor 210 may not include the beams of the antenna module 715 in the subset $S_p$.

In operation 870, if the camera/ALS 710 does not sense the light strength is equal to or above the first threshold, the processor 210 may control the UE 201 to emit light. For example, an application 226 may include a flash light application which controls to emit light from the UE 201.

In operation 875, the camera/ALS 710 senses the light a second time. In some embodiments, the light emitted from the UE 201 may be reflected back by an object 705 and sensed by the camera/ALS 710 a second time. The object 705 may be any object that blocks the light emitted in operation 820. For example, the object 705 may be a part of the user that is holding the UE 201, such as a hand. In another example, the object 705 may be any object a distance away from the UE 201 large enough to reflect light back to the UE 201.

In operation 880, the processor 210 determines if the light sensed in operation 820 is equal to or above a second threshold. In some embodiments, the first threshold may be the same as the second threshold. In other embodiments, the second threshold may be smaller or larger than the first threshold.

In operation 885, if the light sensed in operation 820 is smaller than or equal to the second threshold, the processor 210 enables the beams of the antenna module 715 by the same process as described in operation 815. By enabling the beams, the processor 210 includes the beams of the antenna module 715 in the subset $S_p$.

In operation 890, if the sensed light is above the second threshold, the processor 210 may determine the light emitted is being reflected back to the UE 201. In this case, the processor 210 may not include any the beams of the antenna module n in the antenna patch 715 in the subset $S_p$ because the object 705 that reflects the emitted light may also block a beam that is generated. In some embodiments, if the beams are originally activated, the processor 210 may disable the all beams of the antenna module 715 near the camera/ALS 710 that sensed the reflected light. For example, as illustrated in FIG. 7, the processor 210 may not include any of the beams in the subset $S_p$ from the antenna module 715 corresponding to the camera/ALS 710. In this embodiment, the processor 210 would not include any of the beams $n_1$ through $n_7$ in the subset $S_p$.

Although depicted in FIG. 7 as one camera/ALS 710 and one antenna module 715, other embodiments are possible. For example, if the one camera/ALS 710 is located proximate to the location of AP-14 as illustrated in FIG. 4, the sensing of light not above a threshold may cause the processor 210 to also deactivate one or more antenna modules 715 proximate to antenna patches AP-13, AP-15, AP-1, AP-2, and AP-3. In addition, various embodiments may include multiple cameras/ALS 710 and/or antenna modules 715.

Figure 9A:
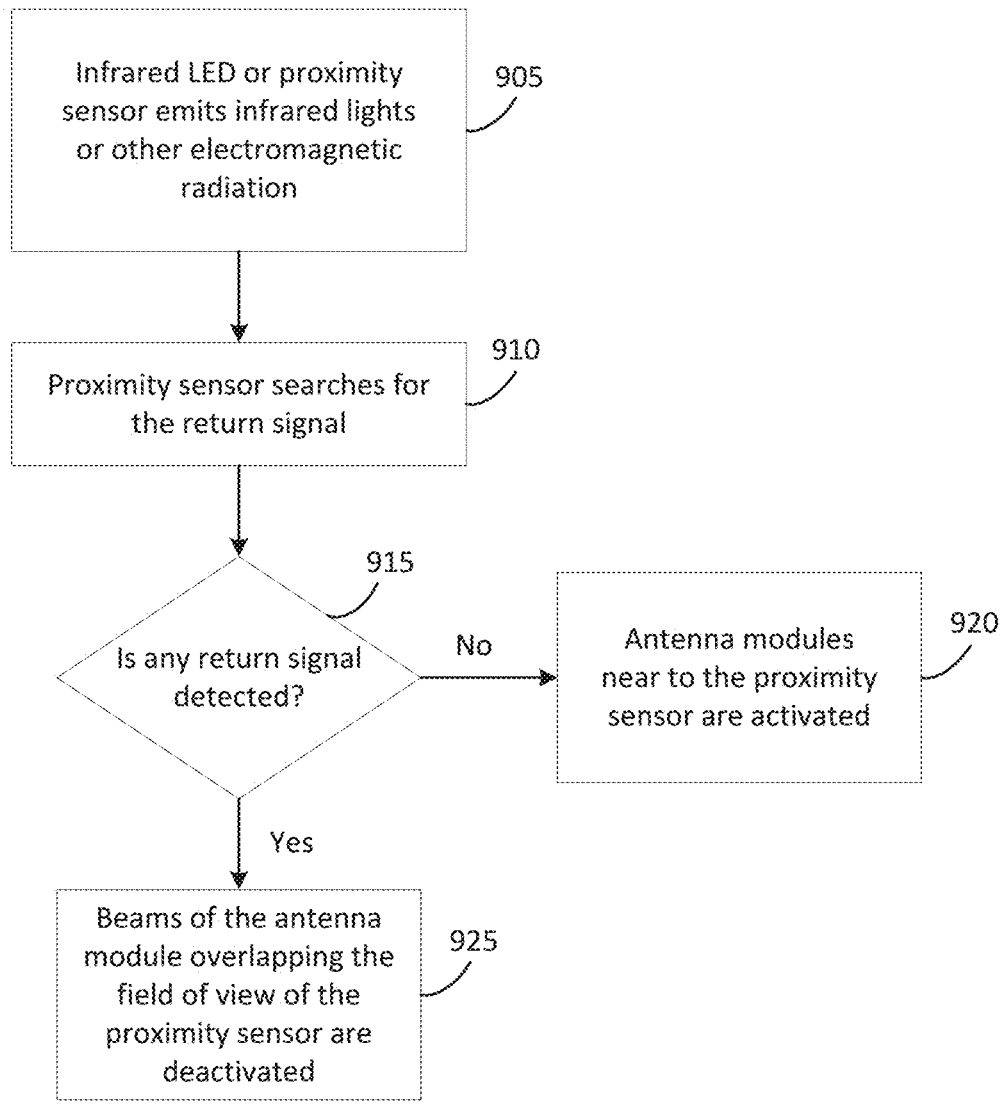
FIGS. 9A and 9B illustrate an example of proximity sensor assisted beam searching or antenna module selection according to various embodiments of the present disclosure.
Figure 9B:
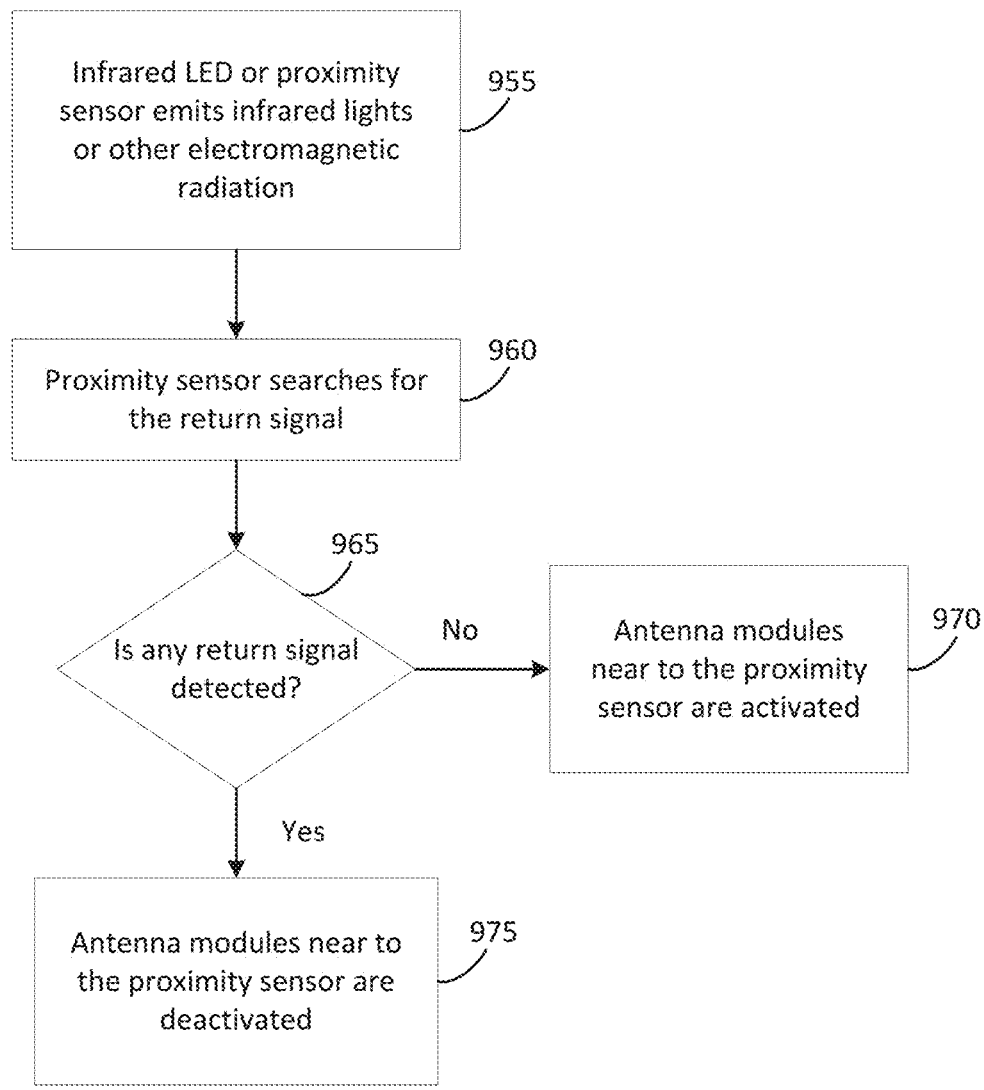

FIGS. 9A and 9B illustrate an example of proximity sensor assisted beam searching or antenna module selection according to various embodiments of the present disclosure. In FIGS. 9A and 9B, a sensor 265, for example a proximity sensor 550, is used to assist beam searching or antenna module selection. The proximity sensor 550 may be located proximate to an antenna patch 715 such as the antenna patch 715 disclosed in FIG. 7.

The proximity sensor 550 may include a field of view 712 similar to the field of view 712 of the camera/ALS 710 discussed in FIG. 7.

In FIG. 9A, in operation 905, the processor 210 controls an infrared LED or proximity sensor 550 to emit electromagnetic radiation such as infrared light.

In operation 910, the processor 210 searches for a return signal. The return signal may comprise a reflection of the original infrared light emitted from the infrared LED or proximity sensor 550.

In operation 915, the processor 210 determines whether the proximity sensor 550 detected a return signal.

In operation 920, if the processor 210 does not detect a return signal, the processor 210 activates the beams of the antenna module 715. By activating the beams, the processor 210 includes the beams of the antenna module 715 in the subset $S_p$. For example, using the antenna patch 715 as a reference, the processor 210 may activate beams $n_6$ and $n_7$ in the subset $S_p$.

In operation 925, if the processor 210 detects a return signal, the processor 210 deactivates the beams of the antenna module 715 that overlap the field of view 712 of the proximity sensor 550. In other words, the processor 210 deactivates the beams of the antenna module 715 that is near the proximity sensor 550. As described above, near is defined as having an overlapping area. For example, using the antenna module 715 as a reference, the processor 210 may deactivate beams $n_1$ through $n_5$ because these beams overlap the field of view 712.

In FIG. 9B, in operation 955, the processor 210 controls an infrared LED or proximity sensor 550 to emit electromagnetic radiation such as infrared light.

In operation 960, the processor 210 searches for a return signal. The return signal may comprise a reflection of the original infrared light emitted from the infrared LED or proximity sensor 550.

In operation 965, the processor 210 determines whether the proximity sensor 550 detected a return signal.

In operation 970, if the processor 210 does not detect a return signal, the processor 210 activates the beams of the antenna module 715. By activating the beams, the processor 210 includes the beams of the antenna module 715 in the subset $S_p$. For example, using the antenna module 715 as a reference, the processor 210 may activate beams $n_6$ and $n_7$ in the subset $S_p$.

In operation 975, if the processor 210 detects a return signal, the processor 210 deactivates the all beams of the antenna module 715 that are located near the proximity sensor 550. As described above, near is defined as having an overlapping area. For example, using the antenna module 715 as a reference, the processor 210 may deactivate beams $n_1$ through $n_7$ because these beams are located near the proximity sensor 550. In other words, the processor 210 deactivates the beams of the antenna module 715 that is near the proximity sensor 550.

Although described in FIGS. 9A-9B as one proximity sensor 550 and one antenna module 715, other embodiments are possible. For example, if the proximity sensor 550 is located near the location of AP-14 as illustrated in FIG. 4, the sensing of electromagnetic radiation may cause the processor 210 to also deactivate one or more proximate antenna patches AP-13, AP-15, AP-1, AP-2, and AP-3. In addition, various embodiments may include multiple proximity sensors 550 and/or antenna modules 715.

Figure 10A:
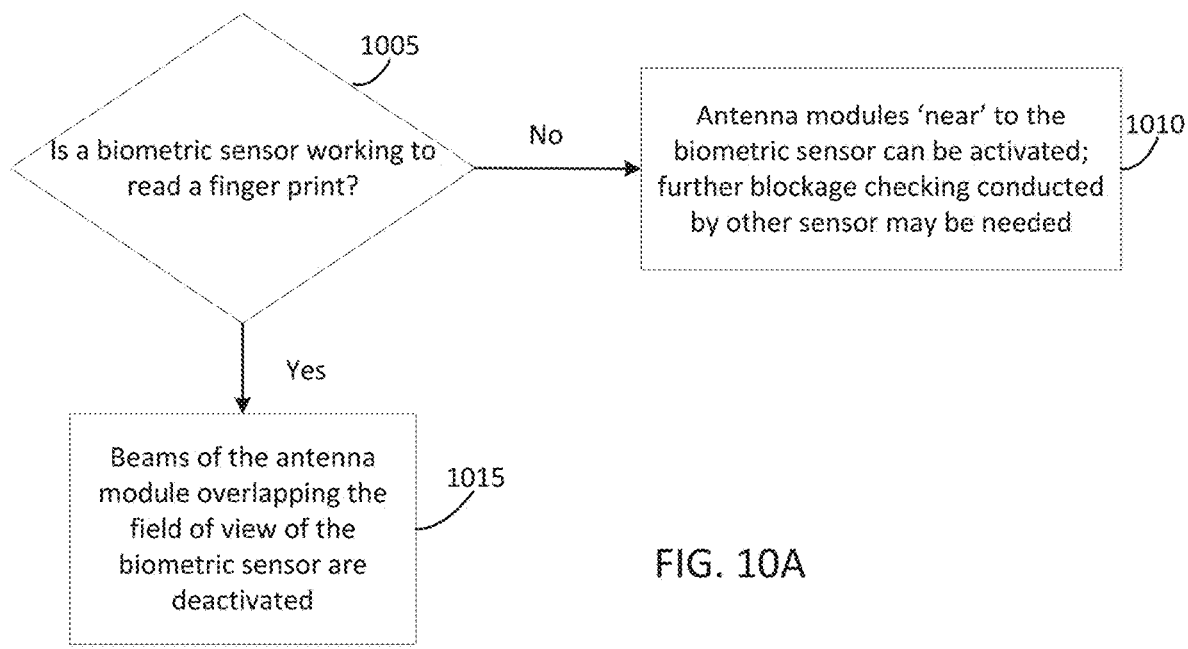
FIGS. 10A and 10B illustrate an example of biometric sensor assisted beam searching or antenna module selection according to various embodiments of the present disclosure.
Figure 10B:
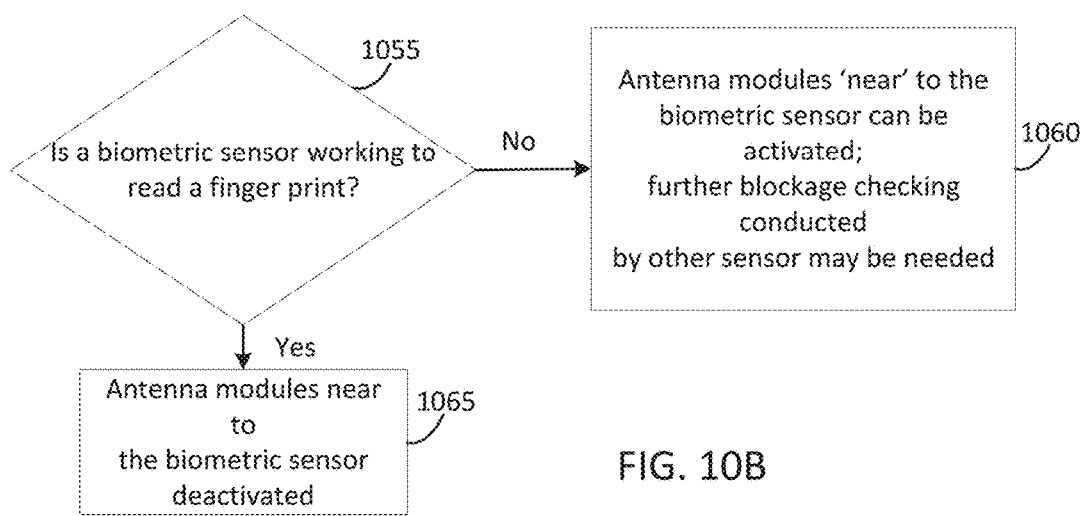

FIGS. 10A and 10B illustrate an example of biometric sensor assisted beam searching or antenna module selection according to various embodiments of the present disclosure. In FIGS. 10A and 10B, a sensor 265, for example a biometric sensor 565, is used to assist beam searching or antenna module selection. A biometric sensor 565 may be used to read a user's fingerprint on the UE 201 or sense other biometric data. If the biometric sensor 565 is active, for example if a user is currently using the biometric sensor 565 to scan a fingerprint, the beams of the antenna modules near to the biometric sensor 565 should not be placed in the subset $S_p$.

One embodiment is illustrated in FIG. 10A. In operation 1005, the processor 210 determines whether a biometric sensor 565 is currently functioning to read a user's fingerprint. In operation 1010, if the biometric sensor 565 is not currently being used to read a user's fingerprint, the antenna modules near to the biometric sensor 565 may be activated and placed in the subset $S_p$. In some embodiments, further beam searching may be conducted, for example camera/ALS 710 based as described in FIGS. 7-8B or proximity sensor 550 based as described in FIGS. 9A-9B. In operation 1015, if the biometric sensor 565 is currently being used to read a user's fingerprint, the beams of the antenna module overlapping the field of view of the biometric sensor 565 are deactivated. For example, using the antenna module 715 as a reference, the processor 210 may deactivate beams $n_1$ through $n_5$ because these beams overlap the field of view 712.

Another embodiment is illustrated in FIG. 10B. In operation 1055, the processor 210 determines whether a biometric sensor 565 is currently functioning to read a user's fingerprint. In operation 1060, if the biometric sensor 565 is not currently being used to read a user's fingerprint, the antenna modules near to the biometric sensor 565 may be activated and placed in the subset $S_p$. In some embodiments, further beam searching may be conducted, for example camera/ALS based as described in FIGS. 7-8B or proximity sensor based as described in FIGS. 9A-9B. In operation 1065, if the biometric sensor 565 is currently being used to read a user's fingerprint, all of the beams of the antenna module near the biometric sensor 565 are deactivated.

Figure 11:
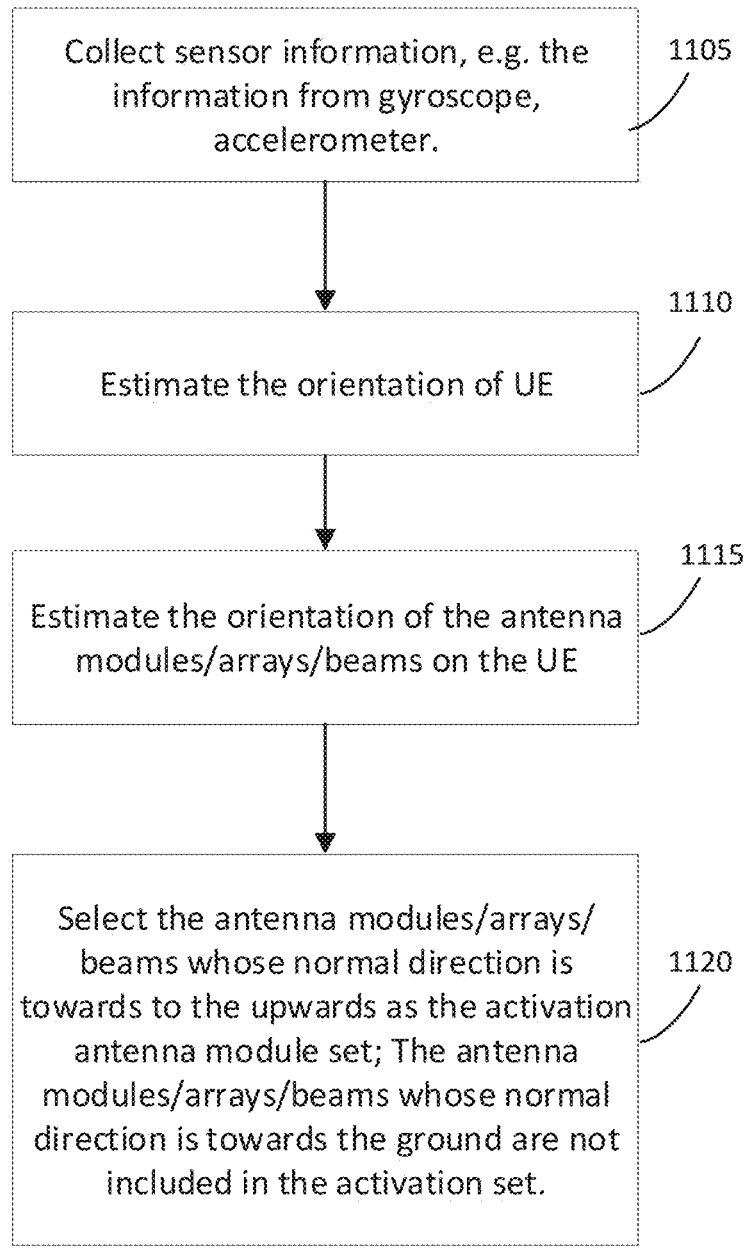
FIG. 11 illustrates an example of antenna orientation estimation based antenna module, array, or beam selection.

FIG. 11 illustrates an example of antenna orientation estimation based antenna module, array, or beam selection. In some embodiments, base stations or other apparatuses may equipped with a wireless transceiver at a place higher than a UE 201. In these embodiments, the signal from the base station may arrive at the UE 201 at an incidence angle smaller than ninety degrees. In this embodiment, if the normal direction of an antenna module is above the ground, there may be a higher probability that the antenna module may receive the signal. In an embodiment where the antenna module faces toward the ground, the signal strength may be considerably weaker than in the embodiment where the antenna module is directed above the ground. Due to this, the antenna module orientation may be estimated.

In operation 1105, the processor 210 may collect information from the sensors 265. In some embodiments, the processor 210 may collect information from the gyroscope 540 or accelerometer 535.

In operation 1110, the processor 210 may estimate the orientation of the UE 201 based on the sensor information collected in operation 1105.

In operation 1115, the processor 210 may estimate the orientation of the antenna modules, arrays, or beams of the UE 201 based on the orientation of the UE 201 estimated in operation 1110. The orientation of the antenna modules, arrays, or beams may be estimated because the geometrical relation of the antenna modules, arrays, or beams relative to the UE 201 is fixed.

In operation 1120, the processor 210 selects the unblocked antenna modules, arrays, or beams which are directed away from the ground and places the beams into the activation set.

Figure 12:
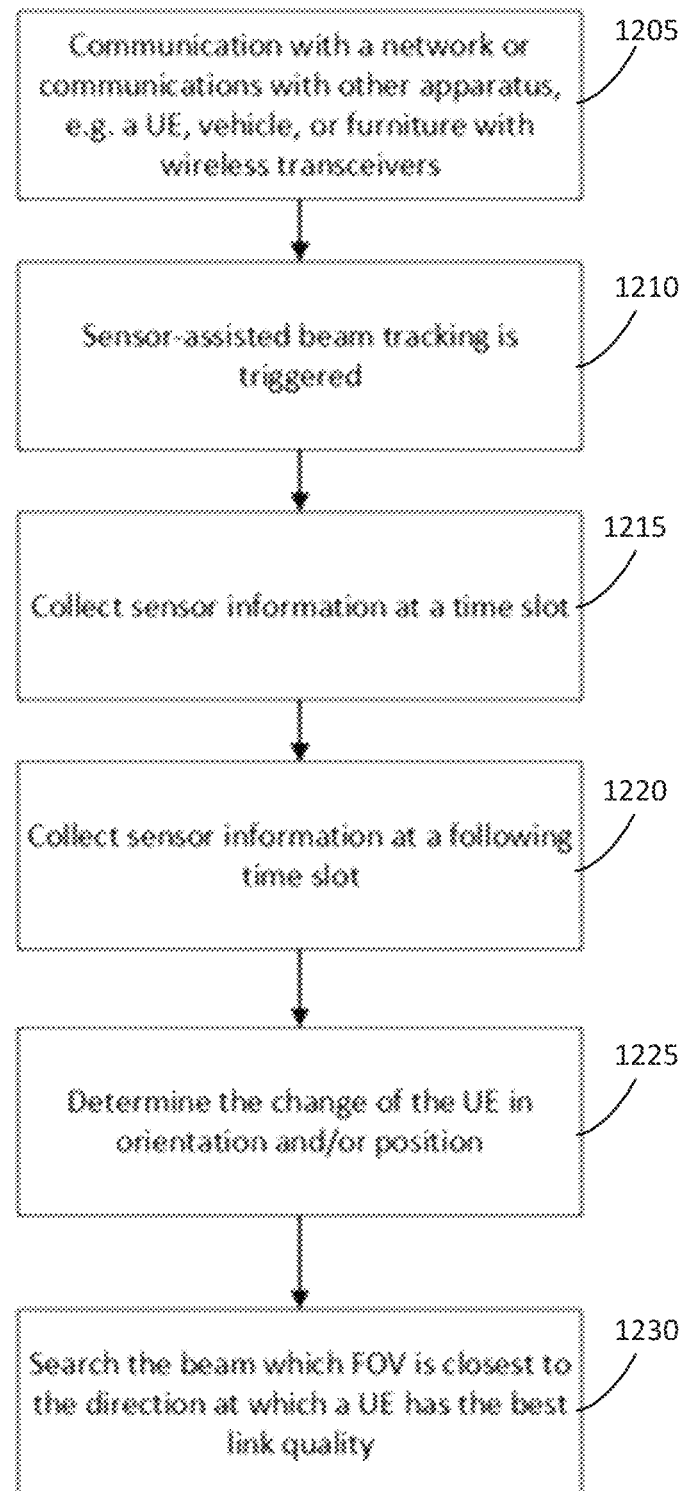
FIG. 12 illustrates an example of beam tracking according to various embodiments of the present disclosure.

FIG. 12 illustrates an example of beam tracking according to various embodiments of the present disclosure. After a UE 201 is connected to a network, a channel condition may change. For example, the channel condition may change due to movement of the UE 201. As the channel condition changes, beam tracking may be performed to determine which beam provides the highest link quality based on the changed channel conditions. In some embodiments, sensors 265 may be used in the beam tracking process.

In operation 1205, the processor 210 communicates, using either of the transceivers 234, 244 with a network or another apparatus, for example another UE, a vehicle, or furniture with a wireless transceiver.

In operation 1210, the sensor assisted beam tracking is triggered. Sensor assisted beam tracking may be triggered based on the UE 201 moving or the link quality degrading.

In operation 1215, the processor 210 collects sensor information at a time slot. In some embodiments, the processor 210 may collect sensor information from one or more sensors 265. The time slot may be predefined, for example at a regular interval.

In operation 1220, the processor 210 collects sensor information at a following time slot. In some embodiments, the processor 210 may collect sensor information from one or more sensors 265. The following time slot in operation 1220 is later in time than the time slot in operation 1215.

In operation 1225, the processor 210 determines a change of the UE 201 based on the collected sensor information in the time slot at operation 1215 and the collected sensor information in the following time slot at operation 1220. The processor 210 may determine a change in status of the UE 201, for example a change in orientation or position.

In operation 1230, the processor 210 may search the beam of which the FOV is closest to the direction at which the UE 201 is determined to have the highest link quality.

In some embodiments, the RF measurement result may be utilized in the sensor assisted beam tracking. In other embodiments, the RF measurement result may not be utilized in the sensor assisted beam tracking.

Figure 13:
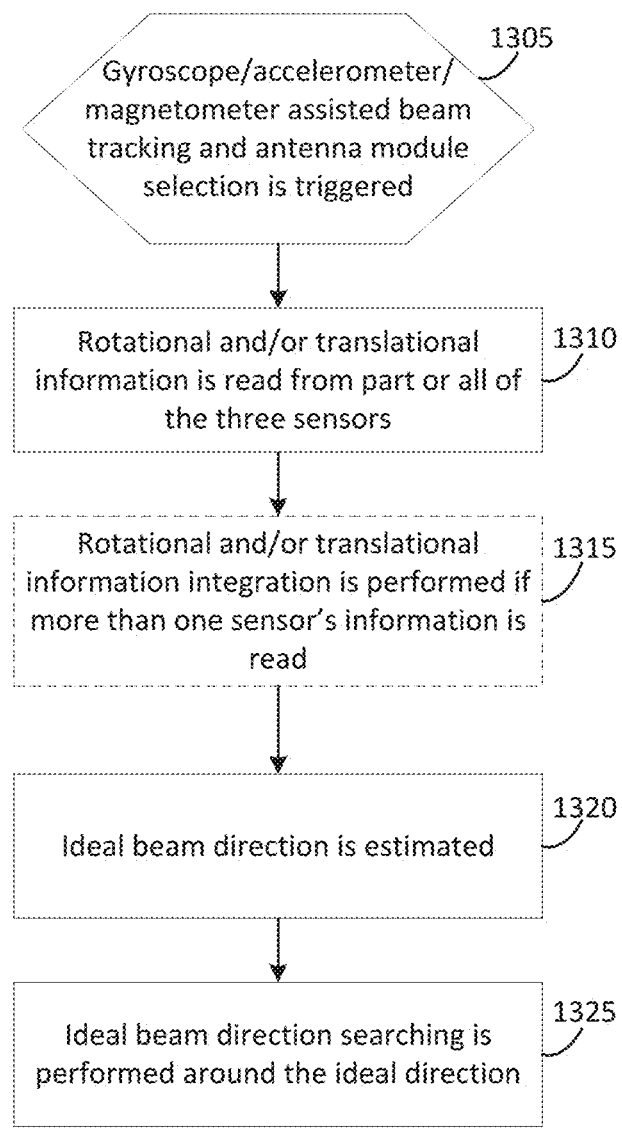
FIG. 13 illustrates an example of gyroscope/accelerometer/magnetometer assisted beam selection or antenna module selection according to according to various embodiments of the present disclosure.

FIG. 13 illustrates an example of gyroscope/accelerometer/magnetometer assisted beam selection or antenna module selection according to according to various embodiments of the present disclosure. In some embodiments, the processor 210 may utilize one of the gyroscope 540, accelerometer 535, or magnetometer 530 to assist beam selection or antenna module selection. In other embodiments, the processor 210 may utilize a combination of two or more of the gyroscope 540, accelerometer 535, and magnetometer 530 to assist beam selection or antenna module selection.

In operation 1305, gyroscope/accelerometer/magnetometer assisted beam selection or antenna module selection is triggered to begin. The gyroscope/accelerometer/magnetometer assisted beam selection or antenna module selection may be triggered for various reasons. For example, in some embodiments, the gyroscope/accelerometer/magnetometer assisted beam selection or antenna module selection may be triggered due to a change in link condition between the UE 201 and an external device. In other embodiments, the processor 210 may recognize a condition change of the UE 201 and trigger the gyroscope/accelerometer/magnetometer assisted beam selection or antenna module selection in response.

In operation 1310, at least one of the gyroscope 540, accelerometer 535, or magnetometer 530 detects rotational and/or translational information regarding the UE 201. The processor 210 detects the data from the at least one of the gyroscope 540, accelerometer 535, or magnetometer 530 and analyzes the data. In some embodiments, the processor 210 may have preset requirements for the accuracy of the rotational and/or translational information. For example, the processor 210 may require translational data from more than one accelerometer 535 located on the UE 201 to be substantially similar before incorporating the data into the beam selection or antenna module selection process. Requiring substantially similar data from more than one sensor 530-540 increases the probability the data provided to the processor 210 is accurate.

In some embodiments, the processor 210 may have preset requirements limiting the quantity of sensors that provide rotational and/or translational information at any given point in time. Although increased information may lead to more accurate data, in some embodiments the resulting processing delay and/or power consumption by the processor 210 in processing data from a quantity of sensors above the limited amount may mitigate the otherwise beneficial results from utilizing a greater number of data points. In some embodiments, the preset requirement limiting the quantity of sensors may be predetermined. In some embodiments, the processor 210 may be able to adjust the preset requirement in real time to determine an optimal number of sensors that may provide rotational and/or translational information at any given point in time.

In operation 1315, if the processor 210 receives data from more than one of the gyroscope 540, accelerometer 535, or magnetometer 530, the processor 210 integrates together the data from each sensor 530-540. This operation is performed to improve the accuracy of the data provided to the processor 210 when compared to providing data from a single sensor. The processor 210 may integrate the data using a variety of methods, for example averaging the data, performing weighted summation, selecting the maximum value, or selecting the minimum value. The integration method is not limited hereto, and the processor 210 may utilize any integration method that integrates the data to provide a usable value for the beam selection or antenna module selection.

In some embodiments, operation 1315 is not needed and therefore is not performed. For example, if the processor 210 only receives data from one sensor in operation 1310, the processor 210 would not need to integrate the data in operation 1315.

In operation 1320, the processor 210 estimates an ideal beam direction based on the integrated rotational and/or translational data. In embodiments where operation 1315 is not performed, in operation 1320 the processor 210 estimates an ideal beam direction based on the rotational and/or translational data received from the sensor 530-540 in operation 1310.

The processor 210 may determine the ideal beam direction by comparing the data received from a sensor 530-540 to an original state of the UE 201. For example, the processor 210 may determine an original orientation and position of the UE 201. When the processor 210 receives and integrates the data from at least one of the sensors 530-540, the processor 210 may utilize this information to compare the updated orientation and position of the UE 201. If the UE 201 is originally in a position where the front plane 415 is facing directly upwards and is not blocked, the ideal beam direction may be at a ninety degree angle from the front plane 415. If the processor 210 receives rotational and/or translational data that the UE 201 has been flipped such that its new position is where the front plane 415 is facing a surface and the back plane 420 is facing directly upwards and not blocked, the processor 210 may determine the ideal beam direction is at a ninety degree angle from the back plane 420.

In operation 1325, the processor 210 performs ideal beam searching around the ideal beam direction. For example, if the UE 201 is in the second position described above where the ideal beam direction is at a ninety degree angle from the back plane 420, the processor 210 may control to perform beam searching on only the beams corresponding to the antenna modules on AP-21 through AP-29.

Figure 14:
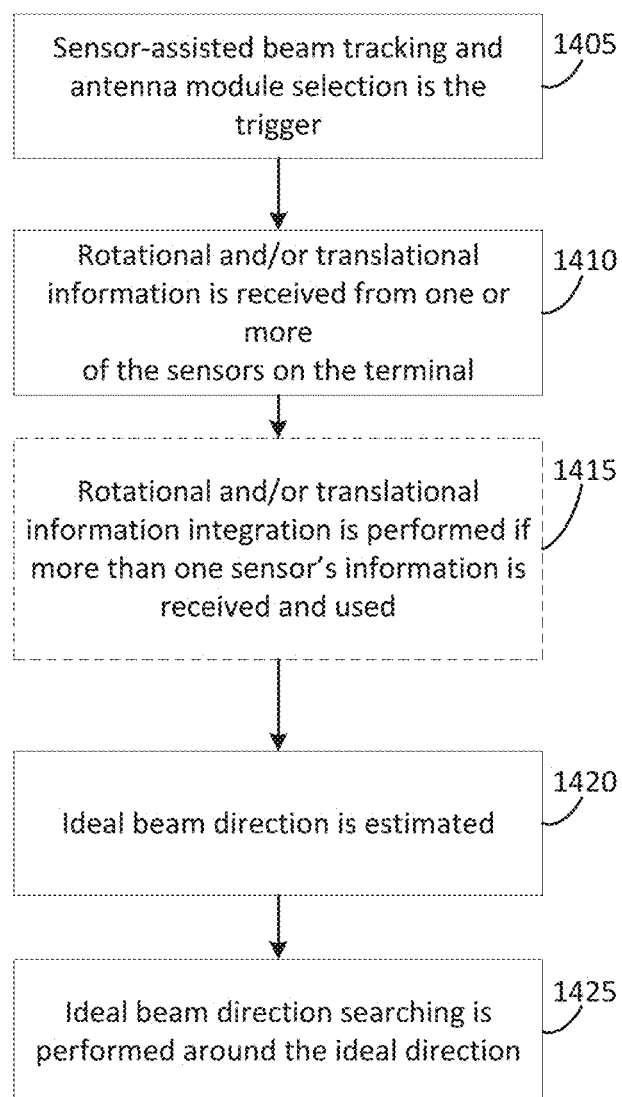
FIG. 14 illustrates another example of gyroscope/accelerometer/magnetometer assisted beam selection or antenna module selection according to various embodiments of the present disclosure.

FIG. 14 illustrates another example of gyroscope/accelerometer/magnetometer assisted beam selection or antenna module selection according to various embodiments of the present disclosure. In some embodiments, the processor 210 may utilize one of the gyroscope 540, accelerometer 535, or magnetometer 530 to assist beam selection or antenna module selection. In other embodiments, the processor 210 may utilize a combination of two or more of the gyroscope 540, accelerometer 535, and magnetometer 530 to assist beam selection or antenna module selection.

In operation 1405, the trigger for the gyroscope/accelerometer/magnetometer assisted beam selection or antenna module selection is the beginning of the sensor assisted beam tracking and antenna module selection. In some embodiments, due to the processor 210 conducting beam tracking or antenna module selection, the processor 210 may determine that data from one or more of the gyroscope 540, accelerometer 535, or magnetometer 530 would result in a more accurate beam selection or antenna module selection. The gyroscope/accelerometer/magnetometer assisted beam selection or antenna module selection may be triggered due to a link condition change or self-aware condition change. In some embodiments, self-aware changes may include the angular speed and/or linear speed of the UE 201 being larger than a threshold at a given time duration or the rotation and/or translation status change being larger than a threshold.

In operation 1410, the processor 210 receives rotational and/or translational data from at least one of the gyroscope 540, accelerometer 535, or magnetometer 530 located on the UE 201. In some embodiments, the processor 210 may have preset requirements for the accuracy of the rotational and/or translational information. For example, the processor 210 may require translational data from more than one accelerometer 535 located on the UE 201 to be substantially similar before incorporating the data into the beam selection or antenna module selection process. Requiring substantially similar data from more than one sensor 530-540 increases the probability the data provided to the processor 210 is correct.

In some embodiments, the processor 210 may have preset requirements limiting the quantity of sensors that provide rotational and/or translational information at any given point in time. Although increased information may lead to more accurate data, in some embodiments the resulting processing delay and/or power consumption by the processor 210 in processing data from a quantity of sensors above the limited amount may mitigate the otherwise beneficial results from utilizing a greater number of data points. In some embodiments, the preset requirement limiting the quantity of sensors may be predetermined. In some embodiments, the processor 210 may be able to adjust the preset requirement in real time to determine an optimal number of sensors that may provide rotational and/or translational information at any given point in time.

In operation 1415, if the processor 210 receives data from more than one of the gyroscope 540, accelerometer 535, or magnetometer 530, the processor 210 integrates together the data from each sensor 530-540. This operation is performed to improve the accuracy of the data provided to the processor 210 when compared to providing data from a single sensor. The processor 210 may integrate the data using a variety of methods, for example averaging the data, performing weighted summation, selecting the maximum value, or selecting the minimum value. The integration method is not limited hereto, and the processor 210 may utilize any integration method that integrates the data to provide a usable value for the beam selection or antenna module selection.

In some embodiments, operation 1415 is not needed and therefore is not performed. For example, if the processor 210 only receives data from one sensor in operation 1410, the processor 210 would not need to integrate the data in operation 1415.

In operation 1420, the processor 210 estimates an ideal beam direction based on the integrated rotational and/or translational data. In embodiments where operation 1415 is not performed, in operation 1120 the processor 210 estimates an ideal beam direction based on the rotational and/or translational data received from the sensor 530-540 in operation 1410.

The processor 210 may determine the ideal beam direction by comparing the data received from a sensor 530-540 to an original state of the UE 201. For example, the processor 210 may determine an original orientation and position of the UE 201. When the processor 210 receives and integrates the data from at least one of the sensors 530-540, the processor 210 may utilize this information to compare the updated orientation and position of the UE 201. If the UE 201 is originally in a position where the front plane 415 is facing directly upwards and is not blocked, the ideal beam direction may be at a ninety degree angle from the front plane 415. If the processor 210 receives rotational and/or translational data that the UE 201 has been flipped such that its new position is where the front plane 415 is facing a surface and the back plane 420 is facing directly upwards and not blocked, the processor 210 may determine the ideal beam direction is at a ninety degree angle from the back plane 420.

In operation 1425, the processor 210 performs ideal beam searching around the ideal beam direction. For example, if the UE 201 is in the second position described above where the ideal beam direction is at a ninety degree angle from the back plane 420, the processor 210 may control to perform beam searching on only the beams corresponding to the antenna modules on AP-21 through AP-29.

Figure 15:
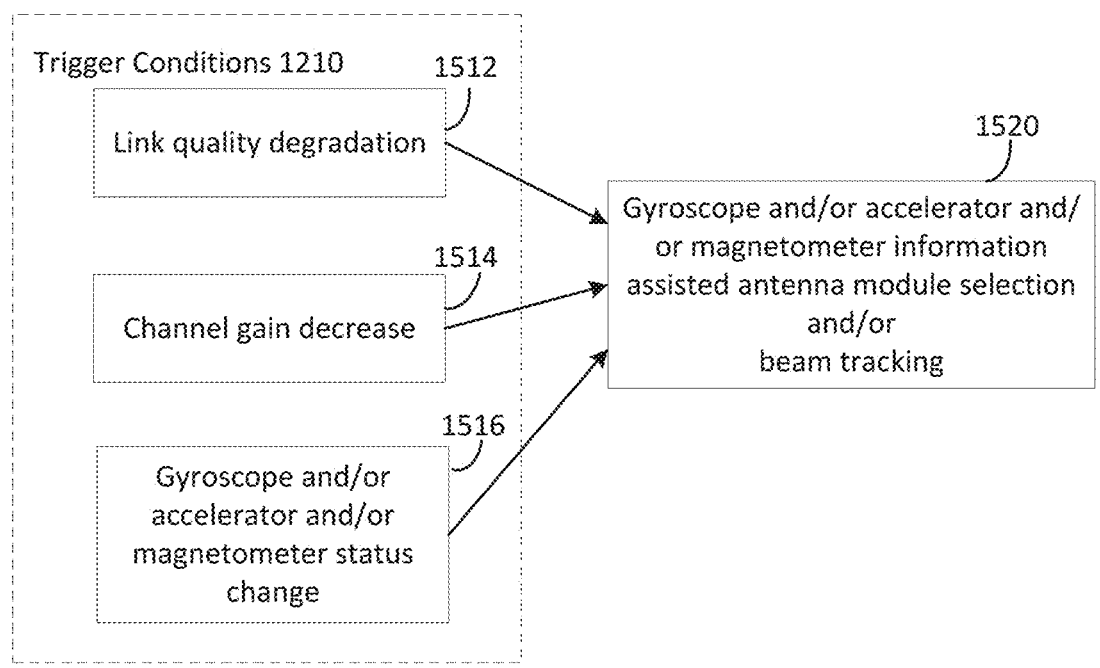
FIG. 15 illustrates example trigger conditions according to various embodiments of the present disclosure.

FIG. 15 illustrates example trigger conditions according to various embodiments of the present disclosure.

In one embodiment, various trigger conditions 1510, such as link quality degradation 1512, channel gain decrease 1514, and gyroscope and/or accelerator and/or magnetometer status change 1516, may occur. Although FIG. 15 illustrates three separate trigger conditions 1510, in some embodiments one or more of the conditions 1512-1516 may occur at one time. In other embodiments, additional trigger conditions may be present that are not illustrated in FIG. 15.

Link quality degradation 1512 includes the degradation of link quality at the baseband processing portion of the UE 201. For example, link quality degradation 1512 may include a degradation of the bit error rate or block error rate. The link quality degradation may include the bit error rate/block error rate being above a threshold. The link quality degradation may be utilized as a trigger condition. The bit error rate/block error rate being larger than a threshold may trigger one or more of the sensors 265 to track the beam and select the antenna module for new beam generation.

The channel gain decrease 1514 comprises a decrease of the channel gain of the UE 201. For example, the system may trigger one or more sensors to track the beam and select the antenna module for the new beam generation.

The gyroscope and/or accelerator and/or magnetometer status change 1516 includes one or more of the gyroscope 540, accelerometer 535, or magnetometer 530 detecting rotational and/or translational motion of the UE 201 that is greater than a threshold. The threshold serves as a buffer to protect against minor movements of the UE 201 that would not result in an impact in the beam tracking and/or antenna module selection. The threshold may be predefined or the processor 210 may change the threshold in real time to provide more efficient beam tracking and/or antenna module selection.

In operation 1520, the gyroscope and/or accelerator information is used to assist beam tracking and/or antenna module selection. In some embodiments, this may be the process described in FIGS. 13 and 14. For example, based on the presence of trigger conditions 1510, the processor 210 may trigger one or more of the sensors 530-540 to begin the process of collecting data to assist in beam tracking and/or antenna module selection.

If one or more of the gyroscope 540, accelerometer 535, or magnetometer 530 detects rotational and/or translational motion of the UE 201 that is greater than a threshold, the processor 210 will utilize the rotational and/or translational information recorded by the sensors 530-540 in the beam tracking and/or antenna module selection process, for example the processes illustrated in FIGS. 13 and 14. If one or more of the gyroscope 540, accelerometer 535, or magnetometer 530 detects rotational and/or translational motion of the UE 201 that is not greater than a threshold, or do not detect any rotational or translational motion of the UE 201, the processor 210 will not utilize sensor data in the beam tracking and/or antenna module selection process.

The rotation and/or translation motion information may be converted to an angular speed and/or linear speed with the information of elapsed time duration. In other embodiments, the sensors 265 may provide the angular speed and/or linear speed of the UE 201. In this embodiment, the angular and/or linear speed may be converted to the rotational and/or translation information. The rotational and translational motion information and/or the angular speed and linear speed are used for tracking the best beam and selecting the antenna module which has the capability of generating the best beam.

Figure 16A:
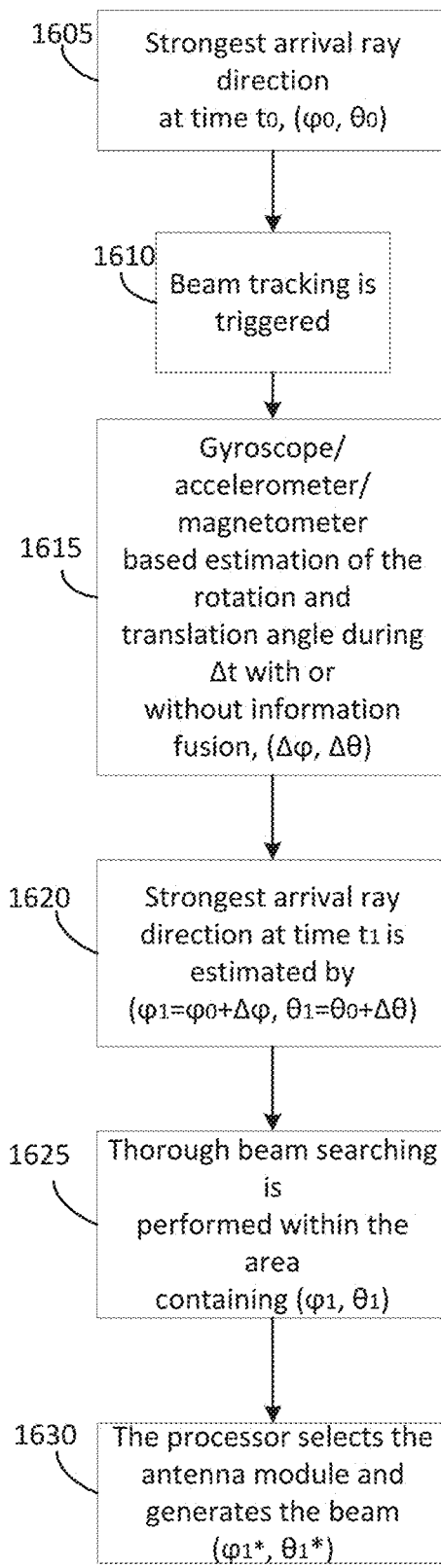
FIGS. 16A and 16B illustrate an example of beam tracking using multiple sensors according to various embodiments of the present disclosure.
Figure 16B:
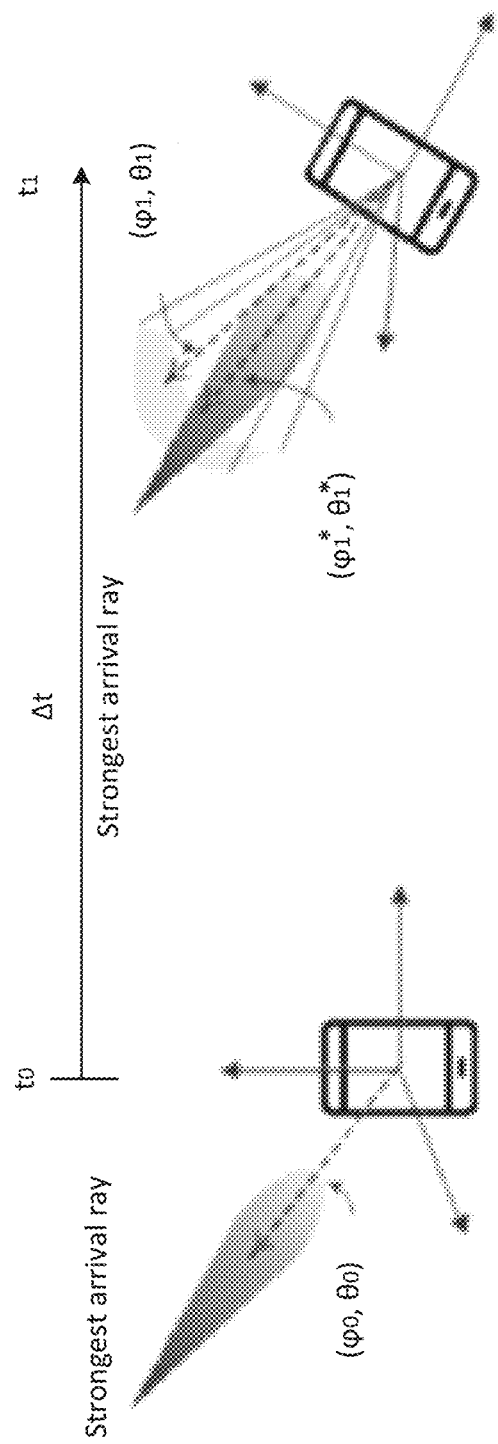

FIGS. 16A and 16B illustrate an example of beam tracking using multiple sensors according to various embodiments of the present disclosure.

In operation 1605, the processor 210 determines a strongest arrival ray direction at time $t_0$. The strongest arrival ray direction at time $t_0$ is denoted by $(\varphi_0, \theta_0)$. In this embodiment, the processor 210 selects a beam L from the activation subset $S_p$ as the beam providing the strongest gain. In this embodiment, the selected beam L points in the direction $(\varphi_0, \theta_0)$.

In operation 1610, beam tracking is triggered at time $t_1$. using the equation $t_1=t_0+\Delta t$, where $\Delta t>0$. During the time range $(t_0, t_1)$, one or more of the sensors 530-540 may track the motion of the UE 201. In various embodiments, the sensors 530-540 tracking the motion of the UE 201 results in the processor 210 receiving rotational and/or translational data regarding the UE 201.

In operation 1615, one or more of the sensors 530-540 obtain data regarding the rotation and translation angle of the UE 201 during a change in time $(\Delta t)$. If data is obtained from more than one of the sensors 530-540, the processor 210 integrates the data from each sensor 530-540. The processor 210 may integrate the data using a substantially similar method as described in operation 1315. In some embodiments, data may be obtained from only one of the sensors 530-540. In these embodiments, data integration may not be performed. After the processor 210 has integrated the data, if necessary, the change in angles of the UE 201 along the $\varphi$ domain and $\theta$ domain are calculated and denoted by $\Delta\varphi$ and $\Delta\theta$, respectively.

In operation 1620, the processor 210 may use the data denoted by the $\Delta\varphi$ and $\Delta\theta$ to estimate the strongest arrival ray direction at a time $t_1$ denoted by $(\varphi_1, \theta_1)$. $\varphi_1$ is calculated by the equation $\varphi_1=\varphi_0+\Delta\varphi$ and $\theta_1$ is calculated by the equation $\theta_1=\theta_0+\Delta\theta$. Time $t_1$ may be any time the UE 201 is attempting to send a signal.

In some embodiments, speed information determined by the processor 210 may also be used for sensor assisted beam tracking. For example, speed information may be calculated from the change in rotation and/or translation information. Within each time period, the linear speed may be equal to the division of the translation information change divided by the time duration, and the angular speed may be equal to the division of the rotation information change divided by the time duration. In other embodiments, the speed information may be read directly from the sensors 265, such as the gyroscope 540 or accelerometer 535.

In operation 1625, the processor 210 performs beam searching within the area contained by $(\varphi_1, \theta_1)$. In various embodiments, beam searching within the area $(\varphi_1, \theta_1)$ may be performed for various reasons. For example, the beam L along the direction of $(\varphi_1, \theta_1)$ may not be able to be generated based on various factors, for example due to limited resolution of an antenna phase shifter or the placement of antenna modules relative to the ideal beam direction. In another example, beam searching within the area $(\varphi_1, \theta_1)$ may not be the beam direction that generates the strongest gain as a result of the finite resolution of one or more of the sensors 530-540 or calculation error. In this embodiment, if the beam L within the area $(\varphi_1, \theta_1)$ does not generate the strongest gain, one or more of the sensors 530-540 may obtain additional data and operations 1615-1625 may be performed again.

In operation 1630, the processor 210 selects the antenna module or antenna modules corresponding to the ideal beam direction found within the area ($\varphi_1$, $\theta_1^*$) and generates the beam L of the antenna module or modules corresponding to the ideal beam direction. The direction of the selected beam L after the beam searching is denoted by ($\varphi_1^*$, $\theta_1^*$).

Figure 17:
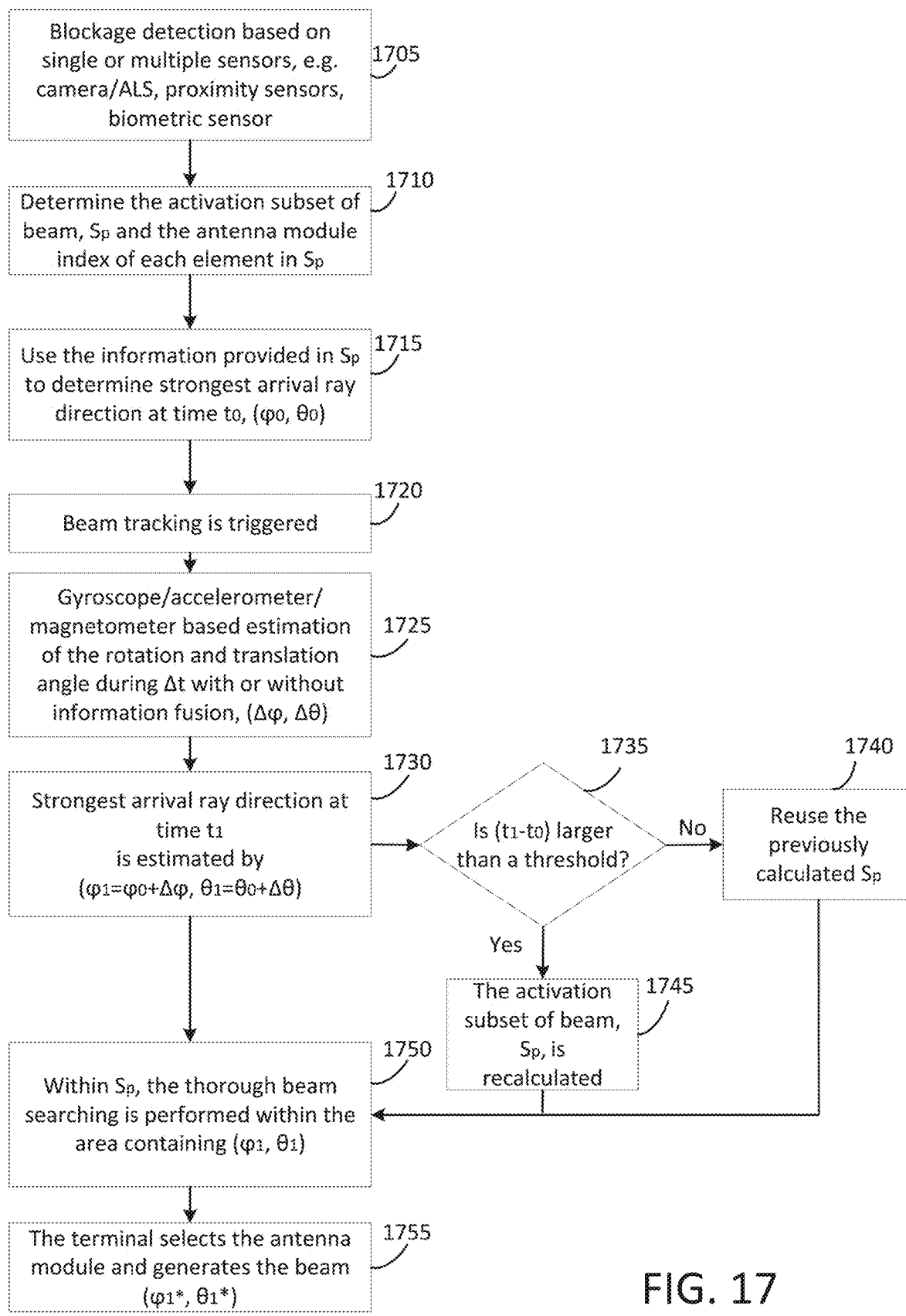
FIG. 17 illustrates an example of sensor assisted blockage detection and beam tracking according to various embodiments of the present disclosure.

FIG. 17 illustrates an example of sensor assisted blockage detection and beam tracking according to various embodiments of the present disclosure. For example, the processor 210 may perform sensor assisted blockage detection and beam tracking upon the detection of an object 705 that may block the beams from one or more antenna modules 715. As illustrated, the sensor assisted blockage detection method works cooperatively with the methods of beam selection and/or antenna module selection.

In operation 1705, a sensor 265 detects a blockage of one or more beams L. For example, operation 1705 may include the processor 210 receiving data from one or more of the sensors 530-565.

In operation 1710, the processor 210 determines the activation subset $S_p$. As described above, the activation subset $S_p$ includes the beams L that are determined not to be blocked, for example by an object 705, by the one or more sensors 530-565.

In operation 1715, the processor 210 determines the beam L from the activation subset $S_p$ that is likely able to generate the strongest gain at a time $t_0$. This direction is denoted by ($\varphi_0$, $\theta_0$).

In operation 1720, beam tracking is triggered at time $t_1$ using the equation $t_1=t_0+\Delta t$, where $t_0>0$. During the time range ($t_0$, $t_1$), one or more of the sensors 530-540 may track the motion of the UE 201. In various embodiments, the sensors 530-540 tracking the motion of the UE 201 results in the processor 210 receiving rotational and/or translational data regarding the UE 201.

In operation 1725, one or more of the sensors 530-565 obtain data regarding the rotation and translation angle of the UE 201 during a change in time ($\Delta t$). If data is obtained from more than one of the sensors 530-565, the processor 210 integrates the data from each sensor 530-565. The processor 210 may integrate the data using a substantially similar method as described in operation 1315. In some embodiments, data may be obtained from only one of the sensors 530-565. In these embodiments, data integration may not be performed. After the processor 210 has integrated the data, if necessary, the change in angles of the UE 201 along the $\varphi$ domain and $\theta$ domain are calculated and denoted by $\Delta\varphi$ and $\Delta\theta$, respectively.

In some embodiments, the sensors 530-565 used cooperatively in operation 1725 may be one or more of the same type of sensor 530-565, one or more of different types of sensors 530-565, or a combination thereof. For example, operation 1425 may utilize a camera 545 on the front plane 415 and a camera 545 on the back plane 420. Each of the camera 545 on the front plane 415 and a camera 545 on the back plane 420 may be turned on to detect light strength. In this embodiment, if both cameras 545 sense that the light strengths are larger than a threshold, the processor 210 may include the beams L of the antenna modules near to the directions of the cameras 545 in the subset $S_p$. In another embodiment, if the light strength sensed by one camera 545, for example the camera 545 located on the back plane 420, is smaller than the threshold but the light strength sensed by the other camera 545, for example the camera 545 located on the front plane 415, is larger than the threshold, the processor 210 may turn on the flash light corresponding to the camera 545 located on the back plane 420. In this example, the beams L of the antenna modules near to the directions of the camera 545 located on the front plane 415 are included in the subset $S_p$, while the camera 545 located on the back plane 420 detects the strength of the reflected light originating from the flash light.

In operation 1730, the processor 210 may use the data denoted by the $\Delta\varphi$ and $\Delta\theta$ to estimate the strongest arrival ray direction at a time $t_1$ denoted by ($\varphi_1$, $\theta_1$). $\varphi_1$ is calculated by the equation $\varphi_1=\varphi_0+\Delta\varphi$ and $\theta_1$ is calculated by the equation $\theta_1=\theta_0+\Delta\theta$. Time $t_1$ may be any time the UE 201 is attempting to send a signal. In some embodiments, the processor 210 may determine whether ($t_1-t_0$) is larger than a threshold. In other embodiments, the processor 210 may perform beam searching within the area containing ($\varphi_1$, $\theta_1$).

In operation 1735, the processor 210 determines whether a time delay calculated by ($t_1-t_0$) is larger than a threshold. In some embodiments, the threshold may be predetermined. In other embodiments, the processor 210 may update the threshold in real time depending on the results of previous beam searching and/or antenna module selection. If the time delay is not larger than the threshold, in operation 1740 the processor 210 will use the subset $S_p$ previously calculated in operation 1710. If the time delay is larger than the threshold, in operation 1745 the processor 210 will recalculate the activation subset $S_p$ using a substantially similar process as in operation 1710.

Once the subset $S_p$ has been calculated, in operation 1750 the processor 210 controls to perform thorough beam searching within the area containing ($\varphi_1$, $\theta_1$) as established in operation 1730. In various embodiments, beam searching within the area ($\varphi_1$, $\theta_1$) may be performed for various reasons. For example, the beam L along the direction of ($\varphi_1$, $\theta_1$) may not be able to be generated based on various factors, for example due to limited resolution of an antenna phase shifter or the placement of antenna modules relative to the ideal beam direction. In another example, beam searching within the area ($\varphi_1$, $\theta_1$) may not be the beam direction that generates the strongest gain as a result of the finite resolution of one or more of the sensors 530-565 or calculation error. In this embodiment, if the beam L within the area ($\varphi_1$, $\theta_1$) does not generate the strongest gain, one or more of the sensors 530-565 may obtain additional data and operations 1615-1625 may be performed again.

In operation 1755, the processor 210 selects the antenna module or antenna modules corresponding to the ideal beam direction found within the area ($\varphi_1$, $\theta_1$) and generates the beam L of the antenna module or modules corresponding to the ideal beam direction. The direction of the selected beam L after the beam searching is denoted by ($\varphi_1^*$, $\theta_1^*$).

In some embodiments, the sensors 530-565, for example the proximity sensor 550 and accelerometer 535, may be jointly used for adaptive beam control to reduce potentially harmful radiation effects. For example, if the UE 201 is a mobile terminal, the processor 210 may automatically disable beams from dipoles in the antenna modules in the antenna patches located near a user's ear when the user holds the UE 201 near their head to make a phone call. More specifically, the processor 210 may disable the beams from dipoles in the antenna modules in the antenna patches AP-1 through AP-20. By so doing, adaptive beam control decreases radiation to a user's head and reduces the potentially harmful effect of radiation. Additionally, adaptive beam control may reduce the overall beam searching time and provide a more efficient process for beam selection or antenna module selection.

Figure 18:
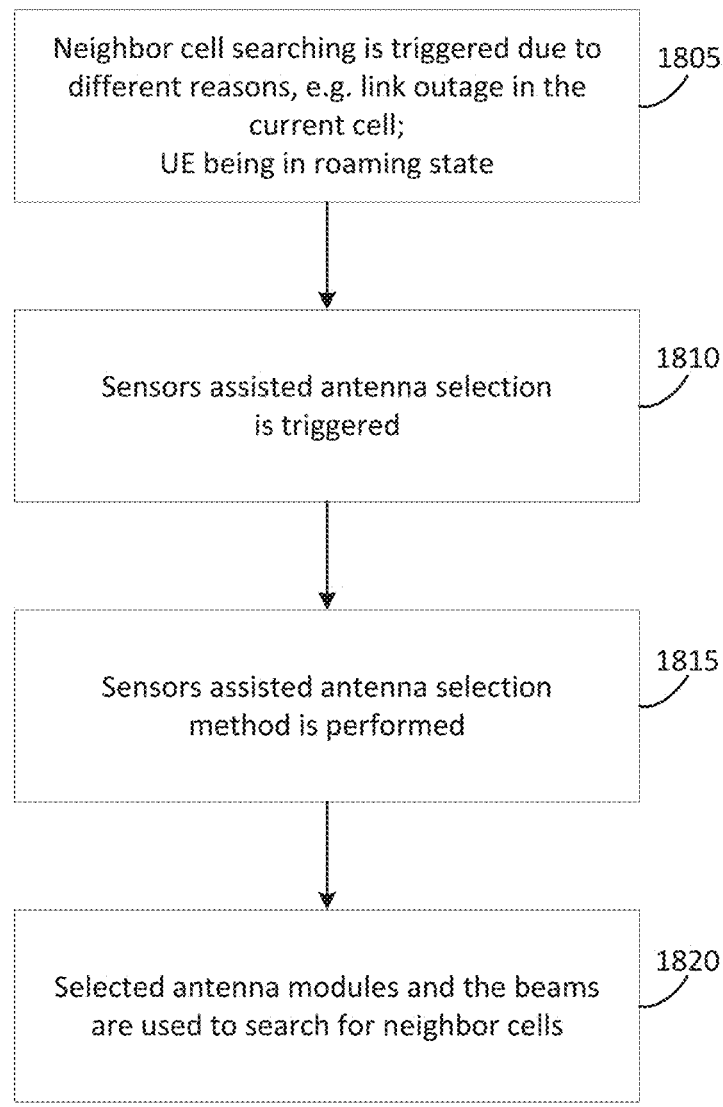
FIG. 18 illustrates an example of sensor assisted neighbor cell searching according to various embodiments of the present disclosure.

FIG. 18 illustrates an example of sensor assisted neighbor cell searching according to various embodiments of the present disclosure. In some embodiments, neighbor cell searching may occur frequently such as when a UE 201 is moving at a rapid speed. If the UE 201 cannot quickly find its serving cell, the UE 201 may need to search for a neighbor cell. Utilizing one or more sensors 530-565 can reduce the time required to perform the neighbor cell searching procedure.

In operation 1805, neighbor cell searching is triggered. Neighbor cell searching may be triggered for different reasons, for example because of a link outage in the current cell or if the UE 201 is in a roaming state. Neighbor cell searching may be triggered more often in embodiments where the UE 201 is utilizing 5G bands, particularly at the mmWave bands because the mmWave link may be blocked more easily than transmissions using 2G, 3G, or 4G bands.

In operation 1810, sensor assisted antenna selection is triggered. In some embodiments, the processor 210 may trigger the antenna assisted antenna selection. In other embodiments, the processor 210 may be automatically triggered by a predetermined condition, such as the link outage in the current cell or the UE 201 being in a roaming state. In some embodiments, sensor assisted antenna selection may be triggered automatically if neighbor cell searching is triggered.

In operation 1815, sensor assisted antenna selection is performed to select the beams L to be included in the activation subset $S_p$, which correspond to antenna modules in antenna patches. In some embodiments, operation 1815 includes operations 1705-1755 described above.

In operation 1820, the beams of the selected antenna modules included in the activation subset $S_p$ are used to search for neighbor cells.

Figure 19:
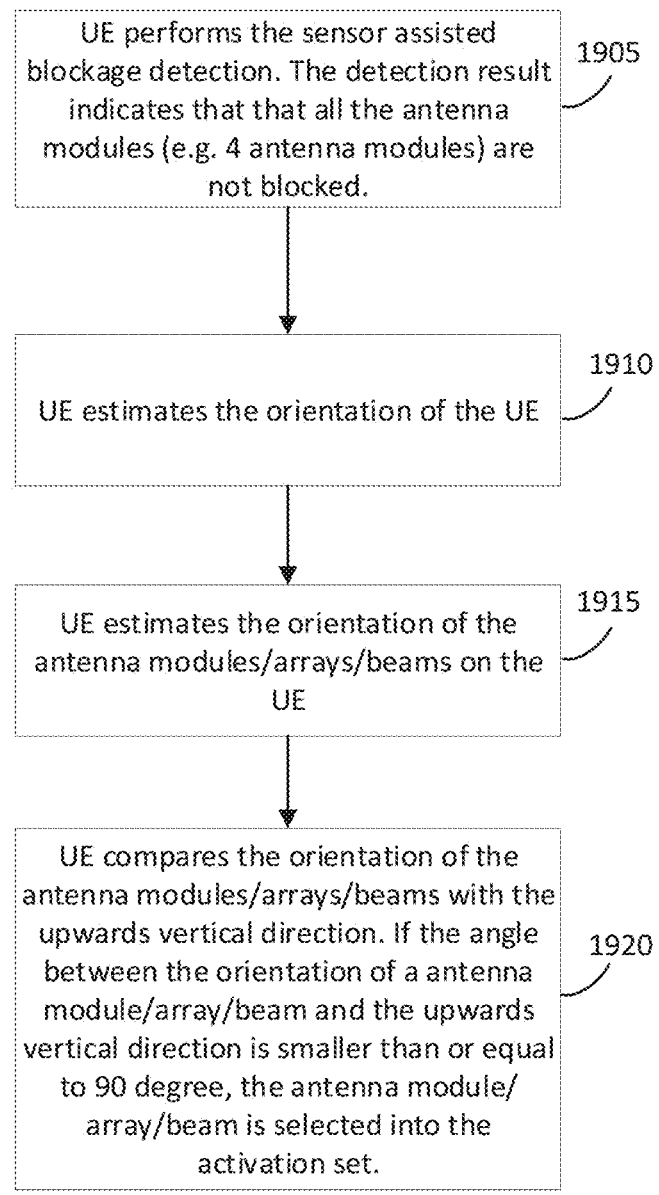
FIG. 19 illustrates an antenna module, antenna array determination in a non-blockage state according to various embodiments of the present disclosure.

FIG. 19 illustrates an antenna module, antenna array determination in a non-blockage state. The determination begins by the UE 201 performing sensor assisted blockage detection.

In operation 1905, the processor 210 performs the sensor-assisted blockage detection. In this operation, the processor 210 determines all the antenna modules are not blocked.

In operation 1910, the processor 210 estimates the orientation of the UE 201.

In operation 1915, the processor 210 estimates the orientation of all antenna modules based on the orientation of the UE 201.

In operation 1920, the processor 210 compares the orientation of all antenna modules with a direction of the UE 201 relative to the ground. For example, the processor 210 may compare the orientation of the antenna modules with an upwards vertical direction relative to the ground. In an embodiment when the angle orientation of an antenna module and the upwards vertical direction is smaller than or equal to ninety degrees, the antenna module may be included in the activation set.

Figure 20A:
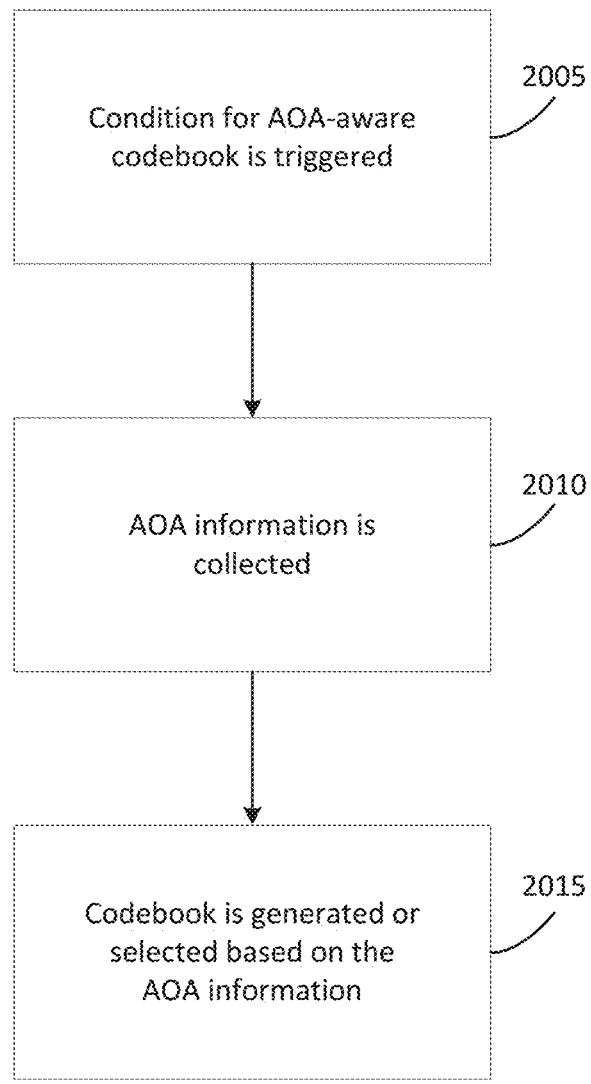
FIGS. 20A and 20B illustrate angle-of-arrival (AOA) aware codebook frameworks according to various embodiments of the present disclosure.
Figure 20B:
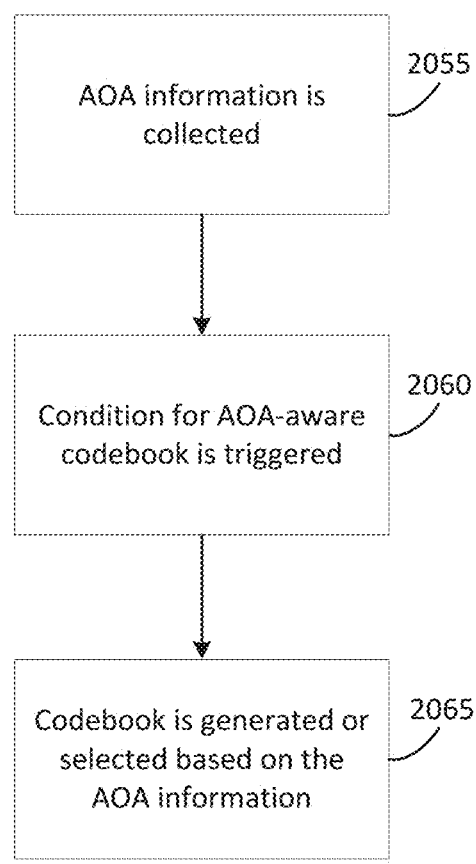

FIGS. 20A and 20B illustrate angle-of-arrival (AOA) aware codebook frameworks according to various embodiments of the present disclosure. Each signal received by the UE 201 arrives at the UE 201 by a specific angle of arrival. In some embodiments, the processor 210 may create a beam codebook using the angle of arrival information from some or all of the signals received by the UE 201. The beam codebook comprises a set of codewords or beams. Each codeword is a vector of complex beamforming weights. The codebook is referred to herein as an AOA-aware codebook.

FIG. 20A illustrates a short-term AOA aware codebook framework. In operation 2005, a condition for the AOA-aware codebook is triggered. In operation 2010, the angle of arrival information is collected by the processor 210. In operation 2015, the AOA-aware codebook is generated or selected based on the collected AOA information.

FIG. 20B illustrates a long-term AOA aware codebook framework. In operation 2055, angle of arrival information is collected. In operation 2060, a condition for the AOA-aware codebook is triggered. In operation 2065, the AOA-aware codebook is generated or selected based on the collected AOA information.

As illustrated in FIGS. 20A and 20B, the short-term and long-term AOA aware codebook frameworks comprise the same steps, but in a different order. In the short-term framework, the collection and measurement of the angle of arrival information may not begin until the need for the AOA-aware codebook has been triggered. Based on the information collected, the processor 210 generates the AOA-aware codebook. In the long-term framework, the angle of arrival information is collected and measured before the need for an AOA-aware codebook is realized. Once the condition for the AOA-aware codebook is triggered, the processor 210 generates the AOA-aware codebook based on the angle of arrival information collected before the condition was triggered.

Figure 21A:
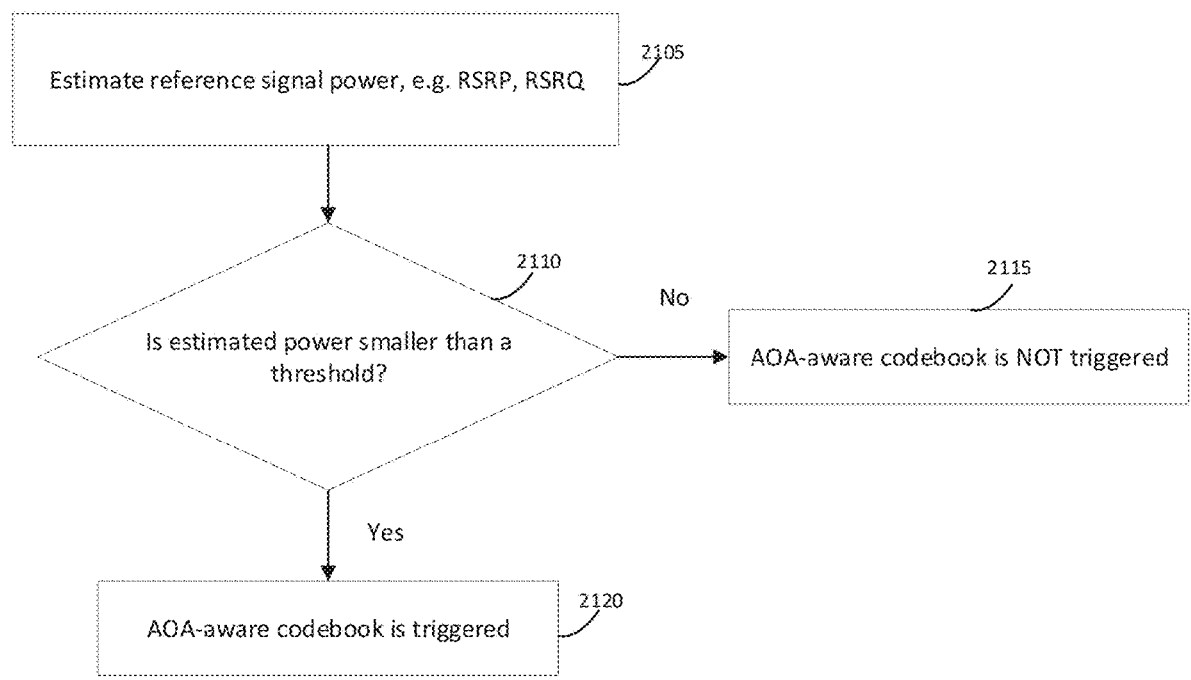
FIGS. 21A and 21B illustrate triggering conditions for an AOA-aware codebook according to various embodiments of the present disclosure.
Figure 21B:
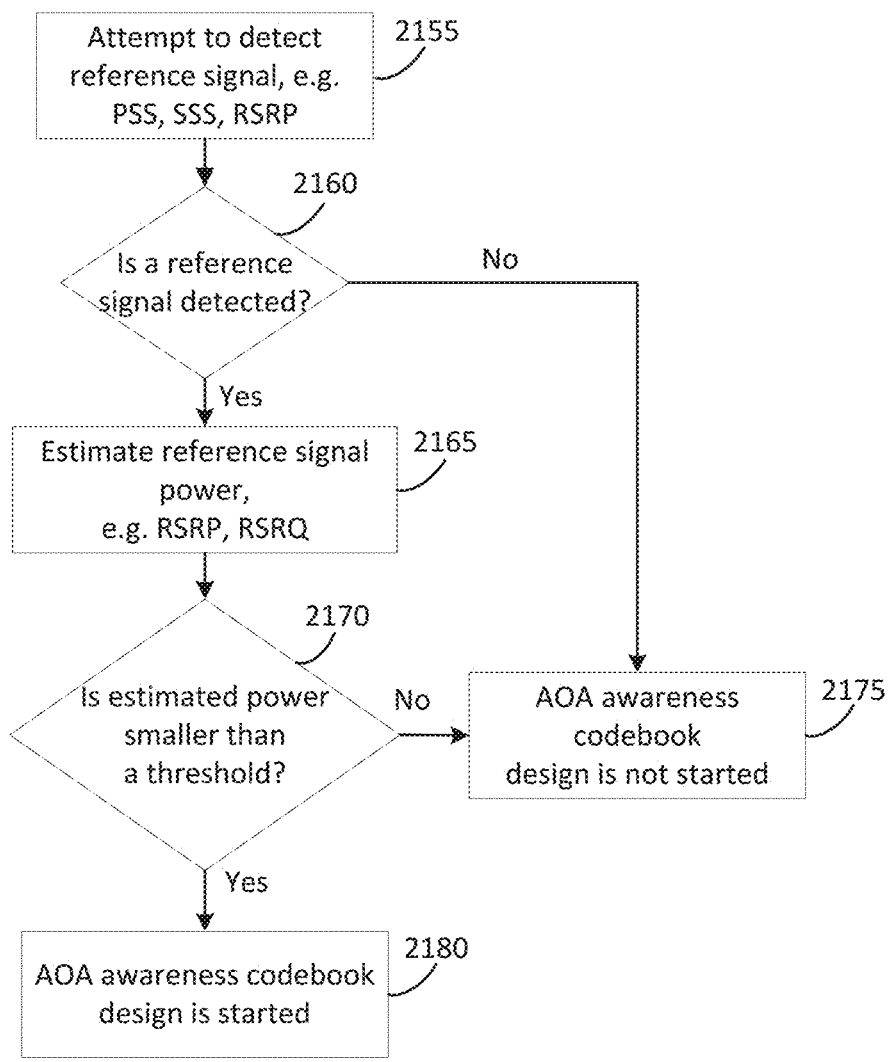

FIGS. 21A and 21B illustrate triggering conditions for an AOA-aware codebook according to various embodiments of the present disclosure. For example, the triggering conditions illustrated in FIGS. 21A and 21B may be examples of the triggering conditions disclosed in operation 2005 or 2060.

FIG. 21A illustrates that the AOA-aware codebook may be triggered when a received reference signal power is low. In operation 2105, the processor 210 estimates a reference signal power. In some embodiments, the power estimation may be derived from a reference signal's received power (RSRP), reference signal's received quality (RSRQ), the power of a common reference signal (CRS), a channel state information reference signal (CSIRS), a tracking reference signal (TRS), a primary synchronization signal (PSS), a secondary synchronization signal (SSS), or other reference signals.

In operation 2110, the processor 210 determines whether the estimated power is smaller than a threshold. In some embodiments, the threshold for estimated power may be predetermined. In some embodiments, the processor 210 may be able to adjust the threshold in real time based on the results of generating previous AOA-aware codebooks.

In operation 2115, if the estimated power is not smaller than the threshold, the generation of AOA-aware codebook is not triggered. Because the reference signal is received at a level of strength above the threshold, the generation and use of the AOA-aware codebook may deliver a minimal improvement over traditional methods of sufficient transmission, and thus an AOA-aware codebook is not generated.

In operation 2120, if the estimated power is smaller than the threshold, the generation of AOA-aware codebook is triggered. Because the reference signal is received at a level of strength below the threshold, the AOA-aware codebook may deliver a significant gain over not using the AOA-aware codebook.

FIG. 21B illustrates another example of triggering conditions for an AOA-aware codebook. In operation 2155, the processor 210 controls to attempt to detect a reference signal. The processor 210 may control to attempt a variety of reference signals, for example RSRP, RSRQ, CRS, CSIRS, TRS, PSS, SSS, or other reference signals.

In operation 2160, the processor 210 determines whether a reference signal is detected. If the reference signal is detected, in operation 2165 the processor 210 estimates the reference signal power of the reference signal detected in operation 2155. In operation 2170, the processor 210 determines whether the estimated power of the reference signal is smaller than a threshold. If the estimated power is smaller than the threshold, in operation 2180 the generation of the AOA-aware codebook is triggered.

In operation 2175, the generation of the AOA-aware codebook is not triggered. In some embodiments, the generation of the AOA-aware codebook is not triggered based on the estimated power not being smaller than a threshold in operation 2170. In some embodiments, the generation of the AOA-aware codebook may not triggered based on the reference signal not being detected in operation 2160.

Figure 22A:
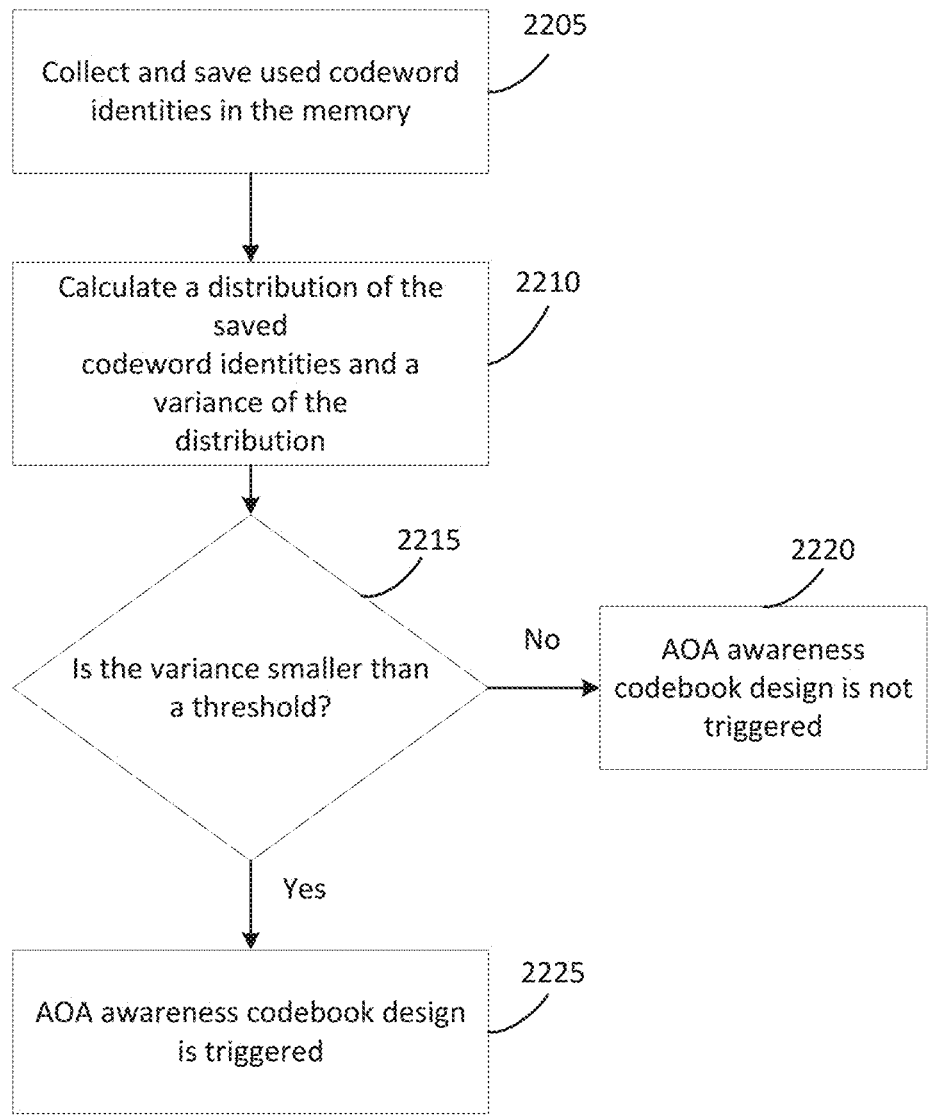
FIGS. 22A and 22B illustrate triggering conditions for an AOA-aware codebook according to various embodiments of the present disclosure.
Figure 22B:
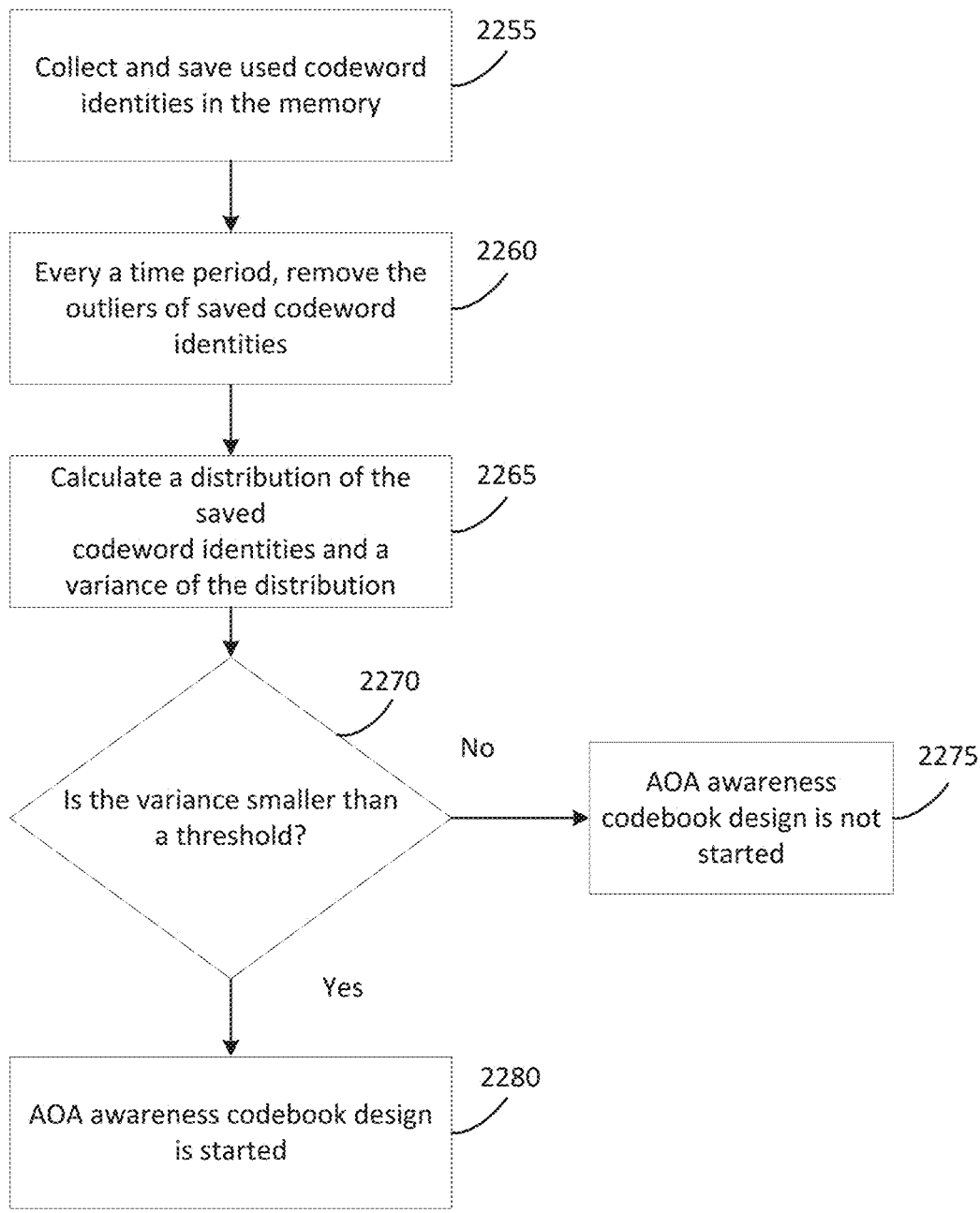

FIGS. 22A and 22B illustrate triggering conditions for an AOA-aware codebook according to various embodiments of the present disclosure.

FIG. 22A illustrates triggering conditions for an AOA-aware codebook according to various embodiments of the present disclosure. In operation 2205, the processor 210 collects used codeword identities and saves the used codeword identities in the memory 220. In some embodiments, time is divided into slots. For example, the time may be divided into slots of 1 ms. The identities of the used codewords may be saved in the memory 220 at the beginning or end of each slot.

In operation 2210, the processor 210 calculates a distribution of the codewords. In some embodiments, the distribution may be calculated at a given time duration, such as every ten seconds or every minute. In other embodiments, the distribution may be calculated when the processor 210 determines there is a need to calculate the given time duration. In some embodiments, the distribution may be calculated in real time as the codeword identities are collected and saved in the memory 220. The processor 210 may also calculate a variance of distribution of the saved codeword identities.

In operation 2215, the processor 210 determines whether the variance of the distribution is smaller than a threshold. In operation 2220, if the variance is not smaller than the threshold, the generation of the AOA-aware codebook is not triggered. In operation 2225, if the variance of the distribution is smaller than the threshold, the generation of the AOA-aware codebook is triggered. For example, the generation of the AOA-aware codebook may be triggered when the variance of the distribution is smaller than the threshold because the potential gain of utilizing the AOA-aware codebook can be significant.

FIG. 22B illustrates triggering conditions for an AOA-aware codebook according to various embodiments of the present disclosure. In operation 2255, the processor 210 collects used codeword identities and saves the used codeword identities in the memory 220. In some embodiments, time is divided into slots. For example, the time may be divided into slots of 1 ms. The identities of the used codewords may be saved in the memory 220 at the beginning or end of each slot.

In operation 2260, the processor 210 removes outliers of saved codeword identities. An outlier is a type of codeword identity that occurs in a low probability. Removing outliers allows a processor 210 to calculate a more accurate variance of the distribution.

The processor 210 may identify the outlier using a variety of different methods. In some embodiments, the processor 210 may identify the outlier by comparing an occurrence rate of the codeword identity over a given time duration with a threshold. In this embodiment, if the occurrence rate of an identity of the selected codeword is smaller than the threshold, the codeword may be identified as an outlier. In some embodiments, the processor 210 may identify the outlier as the codeword identity with the smallest occurrence rate. An outlier may be caused by a variety of reasons, for example a wide spatial spread. A wide spatial spread may occur, for example, when there is no loss of signal (LOS) signal. In embodiments without a LOS signal, the processor 210 may select a non-LOS signal.

In operation 2265, the processor 210 calculates a distribution of the codewords. In some embodiments, the distribution may be calculated at a given time duration, such as every ten seconds or every minute. In some embodiments, the distribution may be calculated when the processor 210 determines there is a need to calculate the given time duration. In some embodiments, the distribution may be calculated in real time as the codeword identities are collected and saved in the memory 220. The processor 210 may also calculate a variance of distribution of the saved codeword identities.

In operation 2270, the processor 210 determines whether the variance of the distribution is smaller than a threshold. In operation 2275, if the variance is not smaller than the threshold, the generation of the AOA-aware codebook is not triggered. In operation 2280, if the variance of the distribution is smaller than the threshold, the generation of the AOA-aware codebook is triggered. For example, the generation of the AOA-aware codebook may be triggered when the variance of the distribution is smaller than the threshold because the potential gain of utilizing the AOA-aware codebook can be significant.

Figure 23:
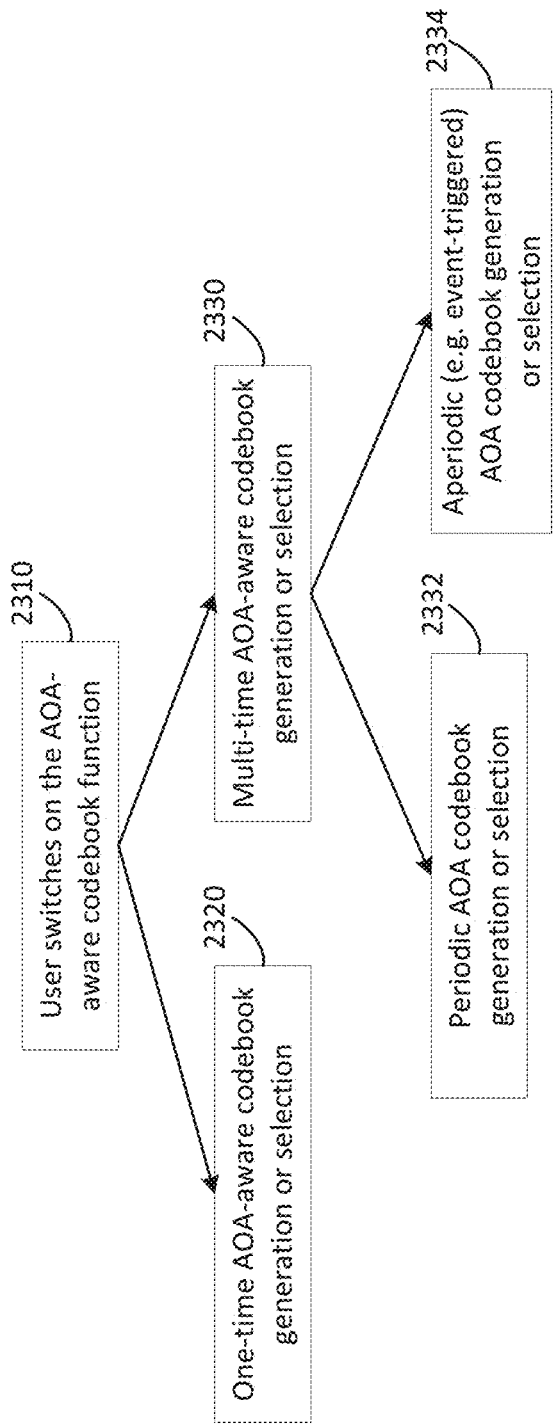
FIG. 23 illustrates a triggering condition for an AOA-aware codebook according to various embodiments of the present disclosure.

FIG. 23 illustrates a triggering condition for an AOA-aware codebook according to various embodiments of the present disclosure. In operation 2310, generation of the AOA-aware codebook is triggered by a user. In some embodiments, user-triggered generation of the AOA-aware codebook may include a user taking an affirmative action to switch on the AOA-aware codebook function. In other embodiments, user-triggered generation of the AOA-aware codebook may include the UE 201 automatically triggering generation of the AOA-aware codebook based on the occurrence of an event. For example, the event occurring to trigger generation of the AOA-aware codebook may be poor voice quality during a phone call, if the UE 201 is a mobile terminal, or content loading slowly on the UE 201 due to poor signal strength and/or connectivity. Once the user has triggered the AOA-aware codebook function, one time AOA-aware codebook generation may occur or multi-time AOA-aware codebook generation may occur.

In operation 2320, one-time AOA-aware codebook generation or selection occurs. One-time AOA-aware codebook generation or selection comprises the methods described in FIGS. 21A-22B occurring a single time.

In operation 2330, multi-time AOA-aware codebook generation or selection occurs. Multi-time AOA-aware codebook generation or selection comprises the methods described in FIGS. 21A-22B occurring more than one time based on the user triggering the AOA-aware codebook generation a single time. Multi-time AOA-aware codebook generation or selection may comprise periodic AOA-aware codebook generation or selection, at operation 2332, or aperiodic AOA-aware codebook generation or selection at operation 2334.

In operation 2332, periodic AOA-aware codebook generation or selection includes AOA-aware codebook generation or selection occurring in a periodic manner. For example, AOA-aware codebook generation or selection may occur every ten seconds, every minute, or every five minutes.

In operation 2334, aperiodic AOA-aware codebook generation or selection includes AOA-aware codebook generation or selection occurring in an aperiodic manner. For example, aperiodic AOA-aware codebook generation or selection may include event-triggered AOA-aware codebook generation or selection. An event triggering aperiodic AOA-aware codebook generation or selection may include the events described in FIGS. 21A-22B.

FIGS. 24A-24F illustrate angle of arrival information collection and/or measurement according to various embodiments of the present disclosure. Angle of arrival information and/or measurement 2410 may be subdivided into short-term AOA methods 2420 and long-term AOA methods 2450. Short-term AOA methods 2420 may be further subdivided into high-resolution angle scanning 2430 and low-resolution angle scanning 2440. Long-term AOA methods 2450 may be further subdivided into used codewords based estimated 2460 and used antenna panel based estimation 2470.

In various embodiments, the term resolution may refer to the angle resolution in the azimuth domain, the elevation domain, or both. In some embodiments, the processor 210 may utilize one or more methods 2420-2470 to collect and/or measure information. For example, the processor 210 may utilize high-resolution angle scanning 2430 for a first coverage region and low-resolution angle scanning 2440 for a second coverage region. In another example, the processor 210 may utilize high-resolution angle scanning 2430 when the batter power of the UE 201 is above a certain level and low-resolution angle scanning 2440 when the battery power of the UE 201 is below a certain level.

Figure 24A:
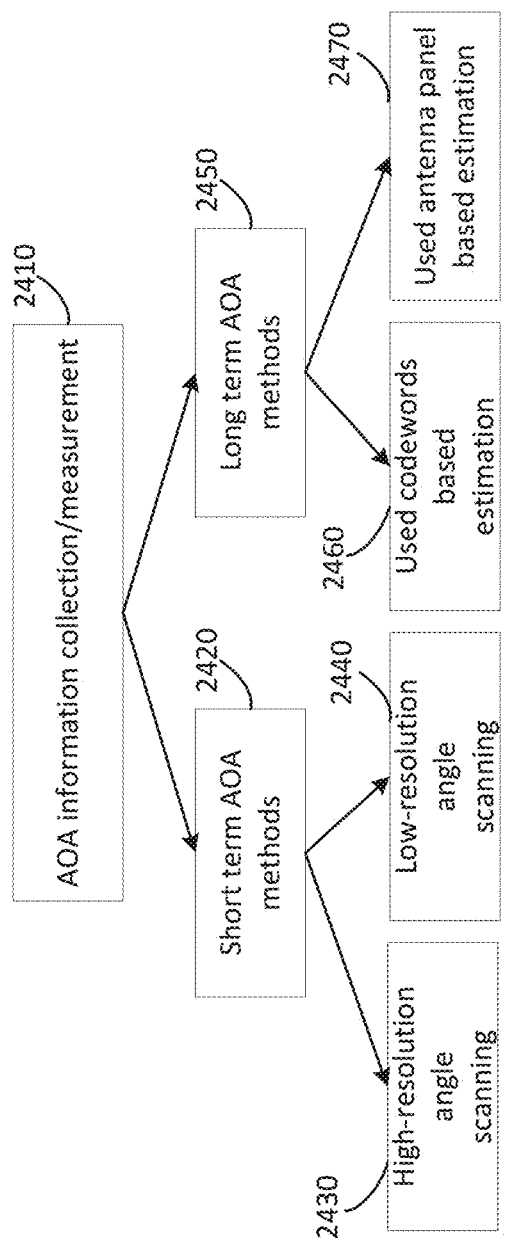
FIGS. 24A-24F illustrate angle of arrival information collection and/or measurement according to various embodiments of the present disclosure.
Figure 24B:
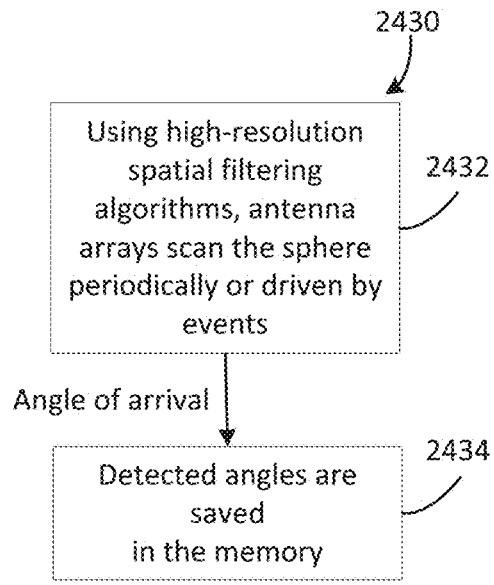

FIG. 24B illustrates high-resolution angle scanning 2430. In the high-resolution angle scanning 2430, high-resolution methods are utilized to estimate the angle of an arrived signal. For example, a high-resolution method utilized by the processor 210 may be the use of an algorithm such as the Multiple Signal Classification (MUSIC) algorithm.

In operation 2432, antenna arrays scan the sphere periodically or aperiodically, for example when driven by an event, using one or more high-resolution spatial filtering algorithms. The antenna arrays may scan the whole or partial sphere for known desired signals such as PSS, SSS, TRS, CSI-RS, or the like transmitted by an associated base station. In some embodiments, the processor 210 may complete the scan using an algorithm such as MUSIC. By controlling to perform scanning, the processor 210 may determine the angle of the strongest signal.

In operation 2434, the detected angles are saved in the memory 220. Once the detected angles are saved in the memory 220, the processor 210 may use the detected angles to generate the AOA-aware codebook. In some embodiments, the angle of arrival information saved in the memory may be erased once the AOA-aware codebook is generated.

Figure 24C:
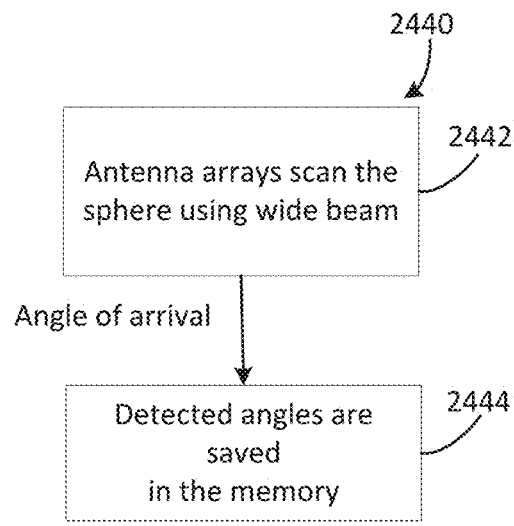

FIG. 24C illustrates low-resolution angle scanning 2440. In the low-resolution angle scanning 2440, low-resolution methods, relative to the high-resolution methods used in high-resolution angle scanning 2430, are utilized to estimate the angle of an arrived signal. Low-resolution angle scanning has a variety of benefits, including but not limited to a lower computation complexity and a shorter time period within which the angle of arrival information is collected and/or measured.

In operation 2442, antenna arrays scan the sphere using a wide beam. In various embodiments, the antenna arrays may scan the whole sphere or part of the sphere. In the low-resolution angle scanning 2440, the whole or partial sphere is scanned at wider angle steps than in the high-resolution angle scanning 2430. In some embodiments, the wide beam may be achieved by activating a number of beams from a pre-existing codebook to detect whether a sufficiently strong signal is arriving at the directions of the beams. In other embodiments, the wide beam may be achieved by activating parts of the antenna elements within an antenna array such that the beamwidth is sufficiently wide.

In operation 2444, the detected angles are saved in the memory 220. Once the detected angles are saved in the memory 220, the processor 210 may use the detected angles to generate the AOA-aware codebook. In some embodiments, the angle of arrival information saved in the memory may be erased once the AOA-aware codebook is generated.

Figure 24D:
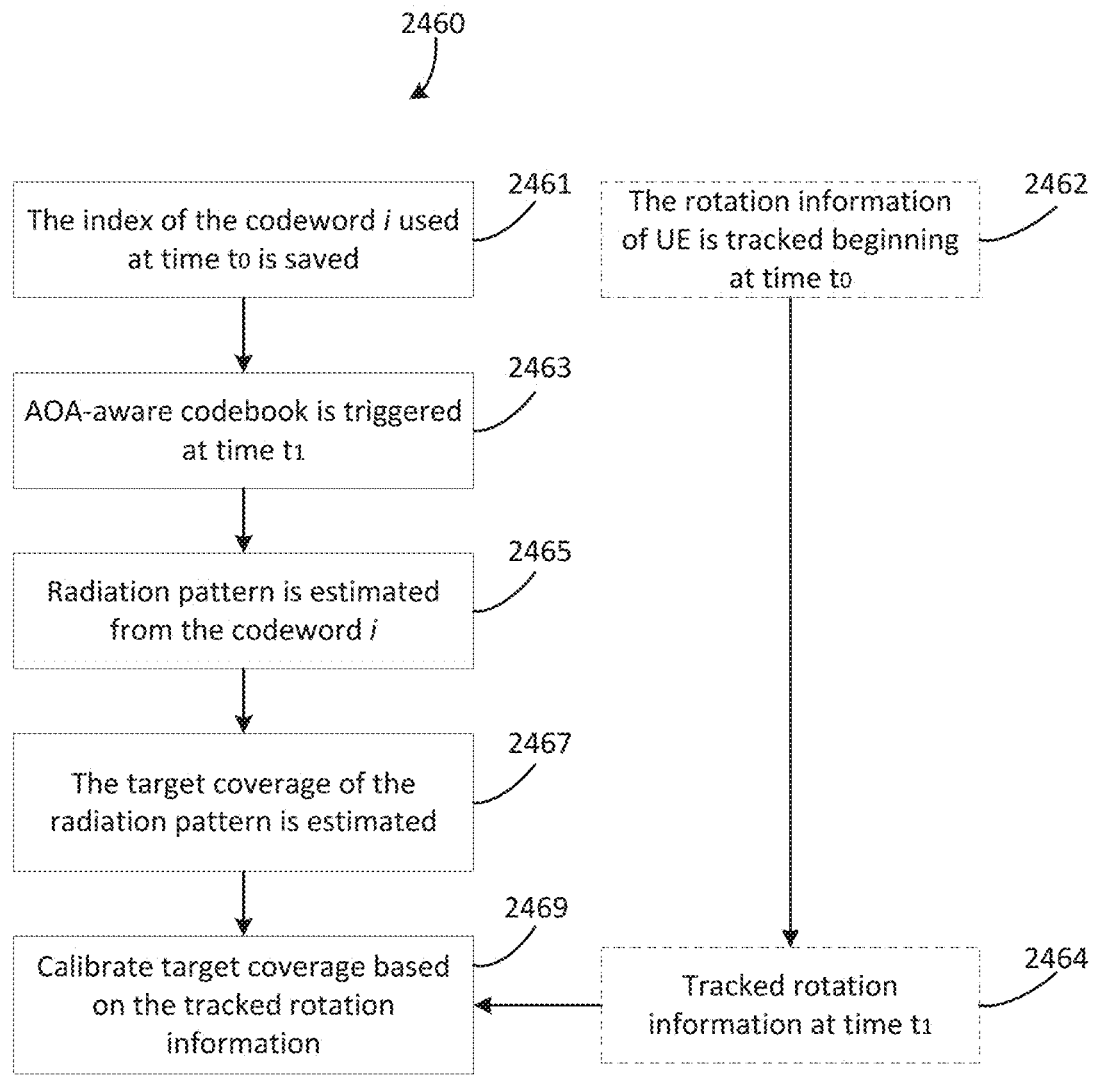
Figure 24E:
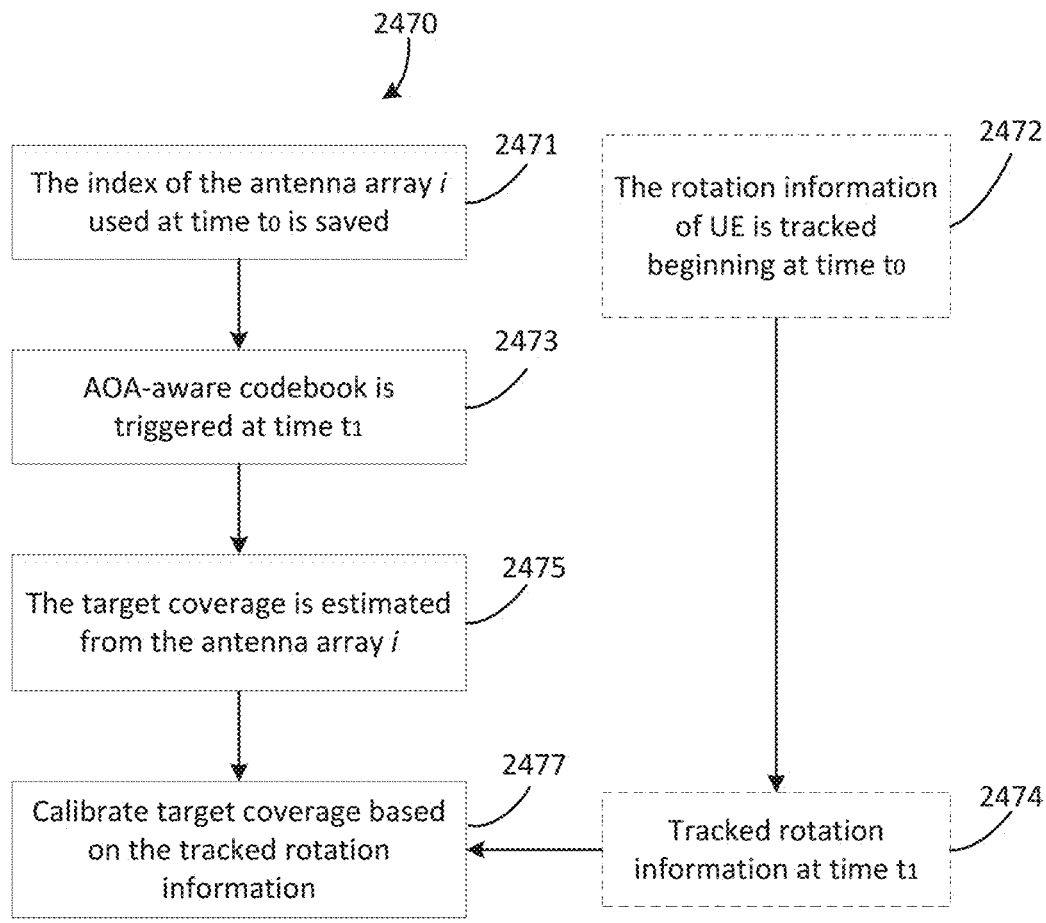
Figure 24F:
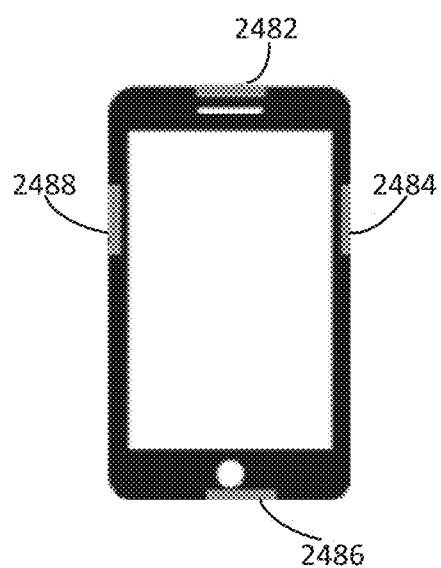

Long-term AOA methods 2450 may be further subdivided into used codewords based estimation 2460 and used antenna panel based estimation 2470. FIG. 24D illustrates used codewords based estimation 2460 and FIGS. 24E and 24F illustrate used antenna panel based estimation 2470.

FIG. 24D illustrates used codewords based estimation 2460. In operation 2461, the index of a codeword i used at time $t_0$ is saved to the memory 220. In operation 2462, the rotation information of the UE 201 begins to be tracked at time $t_0$. In some embodiments, the processor 210 begins to track the rotation information of the UE 201 once the index of a codeword i used at time $t_0$ is saved to the memory 220 in operation 2461.

In operation 2463, at time $t_1$, the generation of the AOA-aware codebook is triggered by the occurrence of a condition. In operation 2464, the rotation information is tracked and updated at time $t_1$.

In operation 2465, the processor 210 estimates a radiation pattern from the codeword i. In operation 2467, the processor 210 estimates the target coverage of the radiation pattern. For example, the processor 210 may estimate the target coverage based on the 3-dB beamwidth of the codeword i. In operation 2469, the processor 210 may calibrate the target coverage based on the estimated target coverage of the radiation pattern from operation 2467 and the tracked rotation information at time $t_1$ from operation 2464. In various embodiments, the calibrated target coverage in the angle of arrival information may be utilized for further processing. For example, the calibrated target coverage may be angle of arrival information used to generate the AOA-aware codebook.

FIG. 24E illustrates used antenna panel based estimation 2470 according to various embodiments of the present disclosure. FIG. 24F illustrates an example UE 201 comprising multiple antenna arrays 2482, 2484, 2486, and 2488 used in the antenna panel based estimation 2470. Each antenna array 2482, 2484, 2486, and 2488 may target a different coverage area.

In operation 2471, the index of an antenna array i used at time $t_0$ is saved to the memory 220. An antenna array i may be any of antenna arrays 2482, 2484, 2486, and 2488. In operation 2472, the rotation information of the UE 201 begins to be tracked at time $t_0$. In some embodiments, the processor 210 begins to track the rotation information of the UE 201 once the index of an antenna array i used at time $t_0$ is saved to the memory 220 in operation 2471.

In operation 2473, at time $t_1$, the generation of the AOA-aware codebook is triggered by the occurrence of a condition. In operation 2474, the rotation information is tracked and updated at time $t_1$.

In operation 2475, the processor 210 estimates the target coverage from the antenna array i. In operation 2477, the processor 210 calibrates the target coverage based on the estimated target coverage from the antenna array i from operation 2475 and tracked rotation information at time $t_1$ from operation 2474. For example, the calibrated target coverage may be the angle of arrival information used to generate the AOA-aware codebook.

Figure 25:
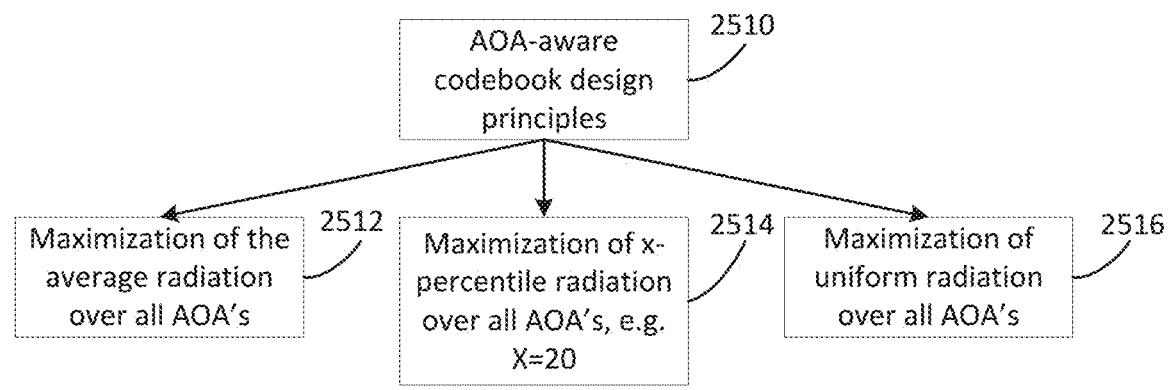
FIG. 25 illustrates AOA-aware codebook design principles according to various embodiments of the present disclosure.

FIG. 25 illustrates AOA-aware codebook design principles according to various embodiments of the present disclosure. The AOA-aware codebook design principles 2510 include three approaches 2512, 2514, and 2516 for generating and/or designing a codebook.

AOA-aware codebook generation and/or selection may be performed by selecting codewords which generate beams over the angle of arrival directions. In some embodiments, the set of codewords may be predetermined based on a certain criterion, for example a DFT-based codebook. In other embodiments, the AOA-aware codebook may be generated and/or selected by loading a codebook that best fits the collected angle of arrival profile according to a design metric. For example, the processor 210 may load an AOA-aware codebook from a predetermined set of codebooks stored in the memory 220. In some embodiments, the design metric may include one or more of the three approaches 2512, 2514, and 2516. Other embodiments are possible.

A first approach 2512 to designing an AOA-aware codebook includes maximizing the average radiation over all angles of arrival. In this approach, the codebook generated corresponds to a set of codewords that provide the largest mean radiation, i.e. beamforming gain, over the angles of arrival of interest. This approach maximizes the mean value of the radiation gain over all measured angles of arrival.

A second approach 2514 to designing an AOA-aware codebook includes maximizing x-percentile radiation over all angles of arrival. In this approach, the value of x is a design parameter. For example, x may equal 20 (x=20). In the example where x=20, the processor 210 would generate an AOA-aware codebook with a 20% rate of distribution.

A third approach 2516 to designing an AOA-aware codebook includes maximizing uniform radiation over all angles of arrival. In this approach, the generated codebook yields the most uniformly distributed radiation among all the angles of arrival.

Although discussed herein as three separate approaches 2512, 2514, and 2516, the three approaches are not exclusive. In some embodiments, the processor 210 may weigh each of the approaches to varying degrees to design an AOA-aware codebook to perform beam selection and/or antenna module selection.

Figure 26:
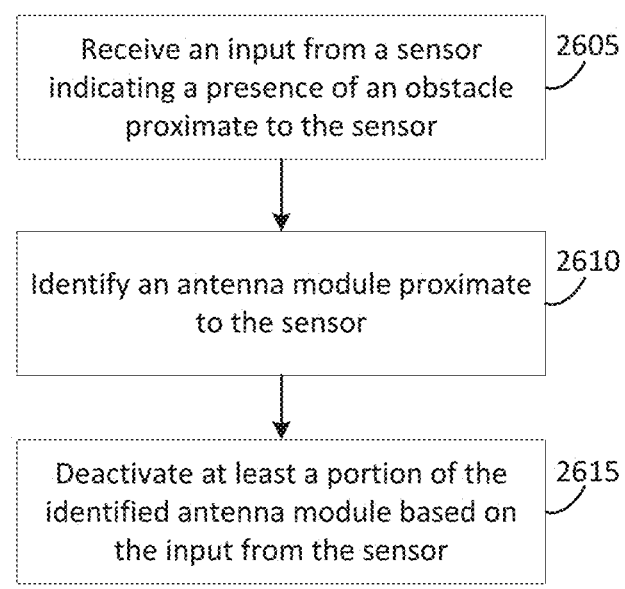
FIG. 26 illustrates an example method of deactivating at least a portion of an antenna module based on input from a sensor according to various embodiments of the present disclosure.

FIG. 26 illustrates an example method of deactivating at least a portion of an antenna module based on input from a sensor according to various embodiments of the present disclosure. The process begins by receiving an input from a sensor.

In operation 2605, the processor 210 receives an input from a sensor 265. The input from the sensor 265 indicates the presence of an obstacle located proximate to the sensor 265. In some embodiments, the obstacle may be the object 605. In some embodiments, the sensor 265 from which the processor 210 receives an input in operation 2605 is at least one of a proximity sensor 550 or a biometric sensor 565.

In operation 2610, the processor 210 identifies an antenna module located proximate to the sensor. In some embodiments, the sensor 265 used in operation 2605 is a first sensor. The example method may also include detecting rotation of a UE 201 by a second sensor. The processor 210 may determine a subset of activated beams to use for wireless communication. The processor 210 may then determine an amount and direction of rotation of the UE 201 based on an input from the second sensor. The processor 210 may then modify the determined subset of activated beams based on the determined amount and direction of rotation of the UE 201.

In operation 2615, the processor 210 deactivates at least a portion of the identified antenna module based on the input from the sensor 265. In some embodiments, deactivating at least a portion of the identified antenna modules includes identifying a position of the obstacle relative to the antenna module. The position may be identified based on the input from the sensor and a position of the sensor relative to the antenna module. The processor 210 may identify beam patterns for beams of the antenna module. The processor 210 may then determine one or more beams that are obstructed by the obstacle based on the beam patterns identified and the position of the obstacle relative to the antenna module. The processor 210 may then deactivate the use of the one or more beams that are determined to be obstructed by the obstacle.

In some embodiments, modifying the determined subset of activated beams is based on an occurrence of a triggering event. In some embodiments, the triggering event may be one of a degradation of link quality by a threshold amount or a change in position of the UE 201 by a threshold amount.

In some embodiments, modifying the determined subset of activated beams includes calculating a change in position of the UE 201. The change in position of the UE 201 may be calculated based on the amount and direction of rotation of the UE 201. The processor 210 may then translate a first direction associated with the determined subset of activated beams into a second direction associated with the change in position of the UE 201. The translating may be performed based on the calculated change in position of the UE 201. The processor 210 may then identify beams associated with the translated second direction. The processor 210 may then modify the determined subset of activated beams based on the beams identified as associated with the translated second direction.

In some embodiments, determining the subset of activated beams may be used to search for a neighbor cell.

In some embodiments, the example method may include collecting statistics of an angle of arrival (AOA) of signal beams. In some embodiments, the processor 210 may generate an AOA-aware codebook based on the collected statistics of an angle of arrival of signal beams.

In some embodiments, collecting the statistics and generating the AOA-aware codebook may include estimating a reference signal power from a reference signal. In some embodiments, the processor 210 may then generate an AOA-aware codebook based on the estimated reference signal power being lower than an estimated reference power threshold.

In some embodiments, collecting the statistics and generating the AOA-aware codebook based on the collected statistics may include collecting and saving an identity of used codewords. In some embodiments, the processor 210 may calculate a distribution of the codewords at a given time duration. In some embodiments, the processor 210—may generate the AOA-aware codebook based on a variance of the distribution being smaller than an estimated variance threshold.

Although depicted herein as a series of steps, one or more steps may not be performed or may be performed in a different order. The embodiments depicted herein do not limit the disclosure.

None of the description in this application should be read as implying that any particular element, step, or function is an essential element that must be included in the claim scope. Moreover, none of the claims is intended to invoke 35 U.S.C. § 112(f) unless the exact words "means for" are followed by a participle.

What is claimed is:

1. A user equipment (UE) comprising:
   a plurality of antenna modules; and
   a sensor positioned proximate to an antenna module in the plurality of antenna modules, the sensor configured to detect an obstacle proximate to the sensor; and
   a processor configured to:
      receive an input from the sensor indicating a presence of the obstacle proximate to the sensor;
      identify the antenna module proximate to the sensor based on accessing a table in which a sensor index of the sensor is related to an antenna module index of the antenna module proximate to the sensor; and
      deactivate at least a portion of the identified antenna module based on the input from the sensor and the sensor index.

2. The UE of claim 1, wherein to deactivate at least the portion of the identified antenna module, the processor is configured to:
   identify, based on the input from the sensor and a position of the sensor relative to the antenna module, a position of the obstacle relative to the antenna module;
   identify beam patterns for beams of the antenna module by accessing the table in which the sensor index of the sensor is related to beam indices of the beams of the antenna module;
   determine, based on the beam patterns and the position of the obstacle relative to the antenna module, one or more of the beams that are obstructed by the obstacle; and
   deactivate use of the one or more beams that are determined to be obstructed by the obstacle.

3. The UE of claim 1, wherein the sensor is at least one of a proximity sensor or a biometric sensor.

4. The UE of claim 1, wherein the sensor is a first sensor, the UE further comprising:
   a second sensor configured to detect rotation of the UE, wherein the processor is configured to:
      determine a subset of activated beams to use for wireless communication;
      determine, based on an input from the second sensor, an amount and direction of rotation of the UE; and
      modify the determined subset of activated beams based on the determined amount and direction of rotation of the UE.

5. The UE of claim 4, wherein:
   the processor is configured to determine to modify the determined subset of activated beams based on occurrence of a triggering event, and
   the triggering event is one of a degradation of a link quality by a threshold amount or a change in position of the UE by a threshold amount.

6. The UE of claim 4, wherein to modify the determined subset of activated beams, the processor is configured to:
   calculate, based on the amount and direction of rotation of the UE, a change in position of the UE;
   translate, based on the calculated change in position of the UE, a first direction associated with the determined subset of activated beams into a second direction associated with the change in position of the UE;
   identify beams associated with the translated second direction; and
   modify the determined subset of activated beams based on the beams identified as associated with the translated second direction.

7. The UE of claim 4, wherein the processor is configured to determine the subset of activated beams to use to search for a neighbor cell.

8. The UE of claim 1, wherein the processor is configured to:
   collect statistics of an angle of arrival (AOA) of signal beams; and
   generate an AOA aware codebook based on the collected statistics.

9. The UE of claim 8, wherein the processor is configured to:
   estimate a reference signal power from a reference signal; and
   generate the AOA aware codebook based on the estimated reference signal power being lower than an estimated reference power threshold.

10. The UE of claim 8, wherein the processor is configured to:
    collect and save an identity of used codewords;
    calculate a distribution of the codewords at a given time duration; and
    generate the AOA aware codebook based on a variance of the distribution being smaller than an estimated variance threshold.

11. A method for sensor assisted beam selection, comprising:
    receiving an input from a sensor indicating a presence of an obstacle proximate to the sensor;
    identifying an antenna module proximate to the sensor by accessing a table in which a sensor index of the sensor is related to an antenna module index of the antenna module proximate to the sensor; and
    deactivating at least a portion of the identified antenna module based on the input from the sensor and the sensor index.

12. The method of claim 11, wherein deactivating at least the portion of the identified antenna modules comprises:
    identifying, based on the input from the sensor and a position of the sensor relative to the antenna module, a position of the obstacle relative to the antenna module;
    identifying beam patterns for beams of the antenna module by accessing the table in which the sensor index of the sensor is related to beam indices of the beams of the antenna module;
    determining, based on the beam patterns and the position of the obstacle relative to the antenna module, one or more of the beams that are obstructed by the obstacle; and
    deactivating use of the one or more beams that are determined to be obstructed by the obstacle.

13. The method of claim 11, wherein the sensor is at least one of a proximity sensor or a biometric sensor.

14. The method of claim 11, wherein:
    the sensor is a first sensor, and
    the method further comprises:
       detecting, by a second sensor, rotation of a user equipment (UE);
       determining a subset of activated beams to use for wireless communication;
       determining, based on an input from the second sensor, an amount and direction of rotation of the UE; and
       modifying the determined subset of activated beams based on the determined amount and direction of rotation of the UE.

15. The method of claim 14, wherein:
modifying the determined subset of activated beams is based on an occurrence of a triggering event, and
the triggering event is one of a degradation of a link quality by a threshold amount or a change in position of the UE by a threshold amount.

16. The method of claim 14, wherein modifying the determined subset of activated beams comprises:
calculating, based on the amount and direction of rotation of the UE, a change in position of the UE;
translating, based on the calculated change in position of the UE, a first direction associated with the determined subset of activated beams into a second direction associated with the change in position of the UE;
identifying beams associated with the translated second direction; and
modifying the determined subset of activated beams based on the beams identified as associated with the translated second direction.

17. The method of claim 14, wherein determining the subset of activated beams is used to search for a neighbor cell.

18. The method of claim 11, further comprising:
collecting statistics of an angle of arrival (AOA) of signal beams; and
generating an AOA aware codebook based on the collected statistics.

19. The method of claim 18, further comprising:
estimating a reference signal power from a reference signal; and
generating the AOA aware codebook based on the estimated reference signal power being lower than an estimated reference power threshold.

20. The method of claim 18, further comprising:
collecting and saving an identity of used codewords;
calculating a distribution of the codewords at a given time duration; and
generating the AOA aware codebook based on a variance of the distribution being smaller than an estimated variance threshold.

* * * * *